(12) United States Patent
Hiroya et al.

(10) Patent No.: US 8,482,856 B2
(45) Date of Patent: Jul. 9, 2013

(54) OPTICAL ELEMENT ARRAY SHEET, DISPLAY DEVICE, AND FABRICATION METHOD FOR SAME

(75) Inventors: Tsutomu Hiroya, Kanagawa (JP); Koji Shigemura, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 12/401,745

(22) Filed: Mar. 11, 2009

(65) Prior Publication Data

US 2009/0231715 A1 Sep. 17, 2009

(30) Foreign Application Priority Data

Mar. 14, 2008 (JP) ................................ 2008-066235

(51) Int. Cl.
*G02B 27/10* (2006.01)
(52) U.S. Cl.
USPC ........................................................ 359/619
(58) Field of Classification Search
USPC ........................................................ 359/619
See application file for complete search history.

(56) References Cited

U.S. PATENT DOCUMENTS

| 6,995,912 | B2* | 2/2006 | Okazaki et al. | 359/619 |
| 7,164,537 | B2* | 1/2007 | Raymond | 359/619 |
| 7,352,511 | B2* | 4/2008 | Boettiger et al. | 359/619 |
| 7,894,139 | B2* | 2/2011 | Yamagata et al. | 359/619 |

FOREIGN PATENT DOCUMENTS

| DE | 3832406 | 3/1990 |
| JP | 10-123633 | 5/1998 |
| JP | 11-095197 | 4/1999 |
| JP | 2000-010061 | 1/2000 |
| JP | 2004-280087 | 10/2004 |
| JP | 2006-047709 | 2/2006 |
| JP | 2006-098525 | 4/2006 |
| JP | 2007-187960 | 7/2007 |

OTHER PUBLICATIONS

CN Office Action dated May 27, 2011, Application No. 200910128541.1 with English Translation.
JP Office Action dated Sep. 25, 2012, with English translation; Application No. 2008-066235.

* cited by examiner

*Primary Examiner* — Jack Dinh
(74) *Attorney, Agent, or Firm* — Young & Thompson

(57) ABSTRACT

An optical element array sheet is provided with: a first area in which an optical element array is arranged that is composed of a plurality of optical elements arranged at a prescribed period, a second area formed at the end of the first area with a surface shape that differs from the first area, and a trough formed at the border of the first area and the second area. The side-wall on the second-area side of the trough is formed inclined with respect to a reference line that extends in the thickness direction of the optical element array with the bottom of the trough as the point of origin.

20 Claims, 30 Drawing Sheets (A-A')

(B-B')

(A-A')

(B-B')

OPTICAL ELEMENT ARRAY SHEET, DISPLAY DEVICE, AND FABRICATION METHOD FOR SAME

BACKGROUND OF THE INVENTION

1. Field of the Invention

The present invention relates to a display device that includes an optical element array sheet that uses lenticular lenses or fly-eye lenses to provide image display directed in a plurality of view-points for implementing control of a three-dimensional display and angle of field; and to a portable terminal, a fabrication method of a display device, a fabrication method of a molding die, and a fabrication method of the optical element array sheet.

2. Description of the Related Art

With the growth of demand for higher functionality of display devices in recent years, display devices have been proposed that are realized by combining optical element array sheets such as lenticular lenses, prism sheets, or diffusion sheets in display panels that use electro-optical elements such as liquid crystal and that enable control over three-dimensional image display or angle of field.

A display device that uses a lenticular lens sheet is next described as one example of such a display device. FIG. 1 is a perspective view giving a schematic representation of a lenticular lens sheet, and FIG. 2 is a schematic view showing an example of the configuration of a display device that uses a lenticular lens sheet and a three-dimensional display method.

As shown in FIG. 1, lenticular lens sheet 110 is formed with one flat surface and the other surface formed by arranging a plurality of cylindrical lenses 111 in a series. Lenticular lens sheet 110 has cylindrical surfaces and is formed with semicircular profiles.

As shown in FIG. 2, left-eye pixels 115a and right-eye pixels 115b corresponding to the left eye and right eye, respectively, of an observer are arranged alternately on display panel 114 to correspond to the focal point of each cylindrical lens 111. In display panel 114, left-eye pixel 115a and right-eye pixel 115b are driven in accordance with a prescribed image signal by a drive circuit (not shown). In this way, cylindrical lenses 111 cause a left-eye image to be formed in left-eye region 120a and a right-eye image to be formed in right-eye region 120b, whereby a three-dimensional image can be shown to the observer of display panel 114. Of course, display panel 114 can also display a normal two-dimensional image by driving right-eye pixel 115a and left-eye pixel 115b by the same image signal.

Display devices that use lenticular lens sheets also include multi-image simultaneous display devices that display a plurality of images at the same time. In these display devices, respectively different images can be shown simultaneously to a plurality of observers by distributing images toward the direction where they can be observed by means of a cylindrical lens by the same method as the above-described three-dimensional display.

As one example of an optical element array sheet, Japanese Patent Application Laid-Open No. 2006-47709 discloses the configuration shown in FIG. 3.

In a display device that uses this type of microlens array or lenticular lens sheet, the display of a high-quality three-dimensional image or the simultaneous display of a plurality of images calls for highly accurate positioning and bonding of the lenticular lens sheet with respect to the display panel. In particular, even greater improvement of positioning accuracy is required for bonding an optical element array sheet to a display panel in a high-definition display device that is incorporated in a portable terminal such as a portable telephone or portable information terminal (PDA: Personal Digital Assistant).

However, regarding the process for bonding a display panel to a lenticular lens that is related to the present invention, investigation for achieving an improvement of the positioning accuracy and reliability of bonding resulted in the identification of problems as next described. Regarding an optical element array sheet of which a lenticular lens sheet is representative, FIGS. 4A and 4B are schematic figures of steps for bonding an optical element array sheet to a display panel. As shown in FIG. 4A, optical element retaining head 201 adopts a configuration provided with a vacuum suction mechanism or a configuration in which adhesive gum is provided as an adhesive material on the retaining surface of optical element retaining head 201. Optical element retaining head 201 uses the suction power realized by the vacuum suction mechanism or the adhesive power realized by the adhesive gum to hold optical element array sheet 101 as shown in FIG. 4A and bonds display panel 114 and optical element array sheet 101 with bonding layer 203 interposed as shown in FIG. 4B.

In a step preceding the mounting step shown in FIGS. 4A and 4B, a step is carried out of peeling a sheet to protect bonding layer 203 from bonding layer 203 in order to bond optical element array sheet 101 to display panel 114. In this step, bonding layer 203 is, for example, peeled from retaining sheet 205 by holding optical element array sheet 101 that is held on retaining sheet 205 by optical element retaining head 201, as shown in FIGS. 5A and 5B.

In addition, protective sheet 204 for protecting bonding layer 203 is provided on optical element array sheet 101 as shown in FIG. 6A. Accordingly, in this step, after optical element array sheet 101 is held by optical element retaining head 201, for example, peeling tape 207 is used to peel protective sheet 204 from bonding layer 203 by causing this peeling tape 207 to adhere to protective sheet 204 as shown in FIG. 6B.

If the holding strength upon optical element array sheet 101 realized by optical element retaining head 201 is insufficient at this time, when optical element array sheet 101 is to be peeled from retaining sheet 205 as shown in FIG. 5A, optical element array sheet 101 will not be retained by optical element retaining head 201 and optical element array sheet 101 cannot be peeled from retaining sheet 205. Alternatively, if the holding strength upon optical element array sheet 101 by optical element retaining head 201 is not sufficient in the step shown in FIGS. 6A and 6B, the problem arises that when protective sheet 204 for protecting bonding layer 203 is separated from peeling tape 207, optical element array sheet 101 will be held on the peeling tape side together with protective sheet 204 and will be detached from optical element retaining head 201.

In the optical element array sheet that uses lenticular lens 110 such as shown in FIG. 7, the type of contact in the contact portion of lenticular lens 110 and optical element retaining head 201 when the optical element array sheet is held by optical element retaining head 201 as shown in FIG. 8 is a linear contact as shown in FIG. 9. In a fly-eye lens such as shown in FIG. 10, the type of contact in the contact portion of the fly-eye lens and optical element retaining head 201 when an optical element array sheet is held by optical element retaining head 201 as shown in FIG. 11 is a point contact as shown in FIG. 12.

As a result, when an optical element array sheet is held by the adhesive strength realized by a gum material provided on an optical element retaining head, the adhesive strength is proportional to the area of contact between the optical element retaining head and the optical element array sheet, and sufficient holding strength is therefore not obtained. When an optical element retaining head provided with a vacuum suction mechanism is used to hold an optical element array sheet, because the surface of the optical element array sheet is not flat but rather formed by a plurality of curved surfaces, air leakage occurs at the surface of the optical element array sheet, whereby the suction strength is reduced and sufficient holding strength is not obtained.

Of the optical element array sheets that relate to the present invention, a flat portion is in some cases formed on the outer periphery of the optical element array sheet to achieve an object, that differs from the object of holding the optical element array sheet, more specifically, that is, to increase the adhesion with a sheet polarizer that is applied to this optical element array sheet. In the case of this optical element array sheet, a trough is formed at the border between optical elements that are arranged at the edge portion of the periphery of the optical element array sheet and the flat portion that is formed adjacent to these optical elements. This trough is formed in the shape of a steep-sided trough in which one side-wall is formed as a curved surface by the optical elements and the other side wall that confronts this side wall is formed as a vertical surface that is parallel to the thickness direction of the optical element array sheet.

Then, to achieve bonding such that air pockets do not occur in the adhering surfaces of the optical element array sheet and the display panel, sufficient pressure must be applied against the optical element array sheet when the optical element array sheet that is held on the optical element retaining head is adhered to the surface panel Accordingly, when the optical element array sheet that relates to the present invention, such as shown in FIG. 3, is used for mounting on a display panel, the pressure applied to the optical element array sheet from the optical element retaining head during bonding causes deformation of the optical element array sheet at the trough that is located at the border between optical elements that are arranged at the outer periphery of the optical element array and the flat portion that is adjacent to these optical elements as shown in FIG. 13A. The problem therefore arises that, with this deformation in the trough portion, stress concentration occurs and cracking 501 occurs from the bottom of the trough as shown in FIG. 13B.

In the optical element array sheet that relates to the present invention, the lack of precise positioning marks complicates precise bonding of the optical element array sheet and the display panel.

SUMMARY OF THE INVENTION

The present invention was realized to solve these problems and therefore has as an object the provision of an optical element array sheet, a display device, and a portable terminal that can prevent damage to the optical element array when bonding an optical element array sheet to a display panel and thus improve reliability of the fabrication process. It is also an object of the present invention to provide a fabrication method of a display device, a fabrication method of a molding die, and a fabrication method of an optical element array sheet.

To achieve the above-described objects, the optical element array sheet according to the present invention is provided with: a first area in which an optical element array is arranged that is formed from a plurality of optical elements arranged at a prescribed period; a second area formed at the end of the first area and with a surface shape that differs from that of the first area; and a trough formed at the border of the first area and the second area. The side-wall on the second-area side of the trough is formed inclined with respect to a reference line that extends in the thickness direction of the optical element array with the bottom of the trough as the point of origin.

In addition, the display device according to the present invention is provided with: the optical element array sheet of the present invention; and a display panel having a picture element unit made up of a plurality of electro-optical elements, that is provided with marks for positioning the optical element array sheet, and that is bonded to the optical element array sheet.

The portable terminal according to the present invention is provided with the display device of the present invention.

In the fabrication method of a display device according to the present invention, an optical element array sheet is provided with: a first area in which an optical element array is arranged that is formed from a plurality of optical elements arranged at a prescribed period, a second area formed at the end of the first area and with a surface shape that differs from that of the first area, and a trough formed at the border of the first area and the second area; the side-wall on the second-area side of the trough being formed inclined with respect to a reference line extending in the thickness direction of the optical element array with the bottom of the trough as the point of origin; and the optical element array sheet is held by using an optical element retaining head provided with an adhesive material or vacuum suction mechanism and is bonded to a display panel.

The fabrication method of a molding die according to the present invention is a method for fabricating a molding die for molding an optical element array sheet that is provided with: a first area in which an optical element array is arranged that is formed from a plurality of optical elements arranged at a prescribed period, a second area formed at the end of the first area and with a surface shape that differs from that of the first area, and a trough formed at the border of the first area and the second area, the side-wall on the second-area side of the trough being formed inclined with respect to a reference line extending in the thickness direction of the optical element array with the bottom of the trough as the point of origin: a step of using a cutting tool that corresponds to the shape of the optical elements to cut a first pattern that corresponds to the first area in a molding die at a first period; and a step of using the cutting tool to cut a second pattern that corresponds to the second area in the molding die at a second period that is shorter than the first period.

In the fabrication method of an optical element array sheet according to the present invention, the purpose of fabrication method is to manufacture an optical element array sheet that is provided with: a first area in which an optical element array is arranged that is formed from a plurality of optical elements arranged at a prescribed period, a second area formed at the end of the first area and with a surface shape that differs from that of the first area, and a trough formed at the border of the first area and the second area, and in which the side-wall on the second-area side of the trough is formed inclined with respect to a reference line extending in the thickness direction of the optical element array with the bottom of the trough as the point of origin and: fabrication is realized by using a molding die provided with: a first pattern that corresponds to the first area and that is formed at a first period using a cutting tool that corresponds to the shape of the optical elements, and a second pattern that corresponds to the second area and that is formed using the cutting tool at a second period that is shorter than the first period.

According to the present invention, in the trough that is located at the border of the first area and the second area, forming the side-wall on the second-area side inclined with respect to a reference line that extends in thickness the direction of the optical element array and with the bottom of the trough as the point of origin prevents damage of the optical element array when the optical element array sheet is bonded to the display panel and thus enables an improvement of the reliability of the fabrication process.

In addition, in the optical element array sheet and display device of the present invention, the provision of marks in the optical element array sheet for precise positioning enables precise bonding of the precise optical element array sheet to the display panel and thus has the effect of allowing a display device with high image quality to be obtained.

DETAILED DESCRIPTION OF THE PREFERRED EMBODIMENTS

First Embodiment

Explanation next regards a case in which a lenticular lens that uses a cylindrical lens is used as the optical element in the present embodiment.

Figure 14:
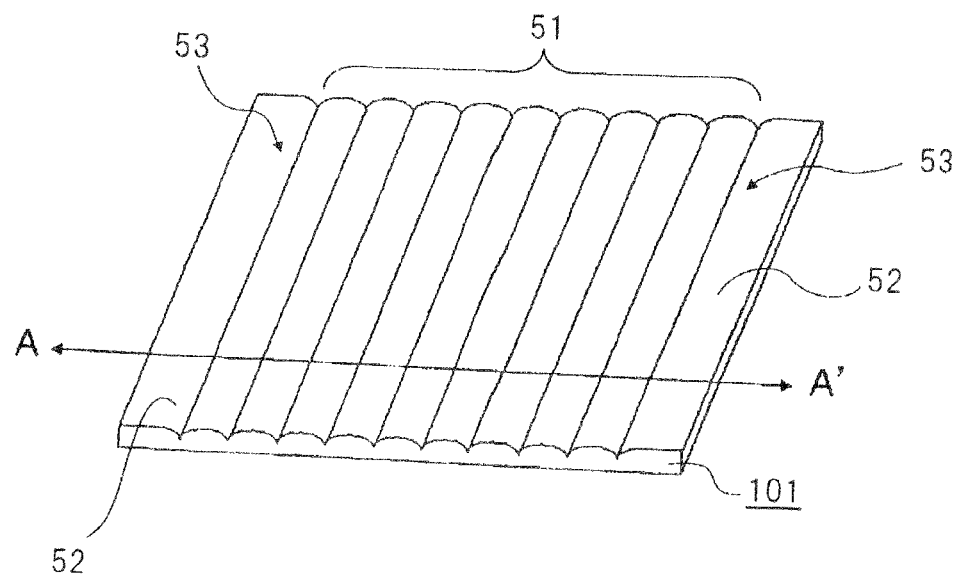
FIG. 14 is a perspective view showing the optical element array sheet of the first embodiment.
Figure 15:
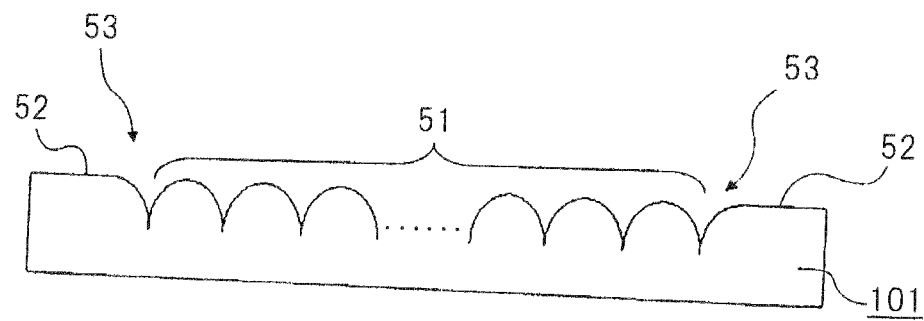
FIG. 15 is a sectional view taken along line A-A' of the optical element array sheet shown in FIG. 14.
Figure 16:
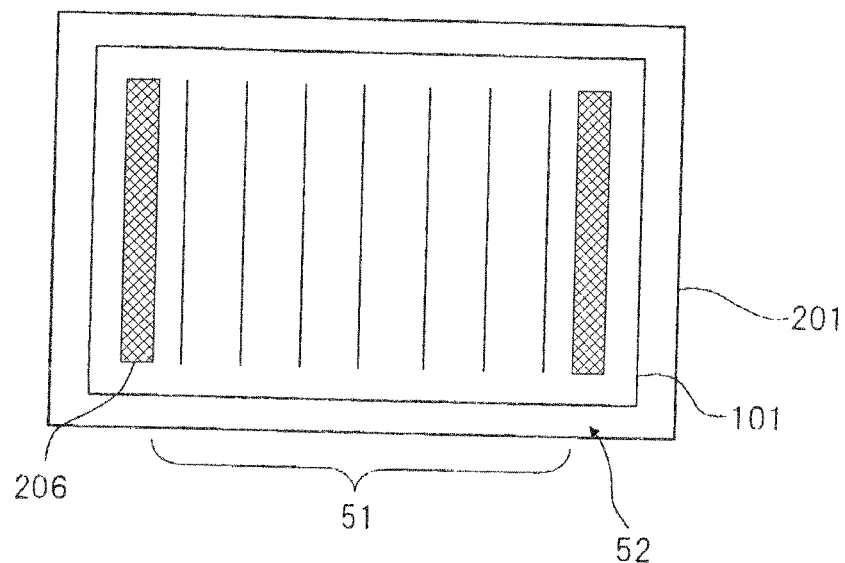
FIG. 16 is a plan view of the contact surface between the optical element array sheet of the first embodiment and the optical element retaining head when the optical element array sheet is held by the optical element retaining head.
Figure 17:
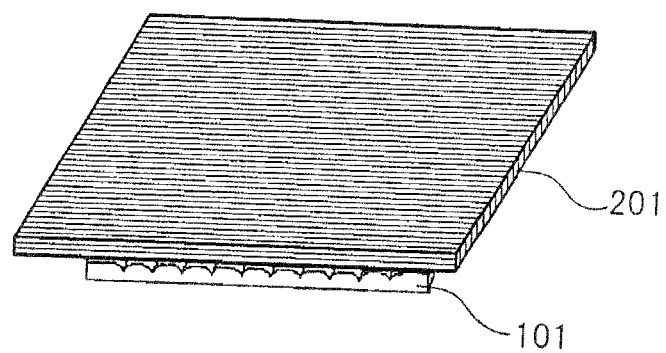
FIG. 17 is a perspective view showing the state when the optical element array sheet of the first embodiment is held by the optical element retaining head.

FIG. 14 shows a perspective view of the optical element array sheet of the first embodiment, and FIG. 15 shows a sectional view taken along line A-A' in FIG. 14. FIG. 16 is a plan view showing the contact surface between the optical element array sheet of the present embodiment and an optical element retaining head when the optical element array sheet is held by the optical element retaining head as shown in FIG. 17.

As shown in FIGS. 14 and 15, optical element array sheet 101 of the present embodiment is provided with: first area 51 in which an optical element array is arranged that is composed of a plurality of optical elements arranged at a prescribed period, second area 52 formed at the end of first area 51 with a surface shape that differs from that of first area 51; and trough 53 formed at the border of first area 51 and second area 52.

At the outer ends, flat portions that are second areas 52 are formed as planes orthogonal to the thickness direction of optical element array sheet 101. As shown in FIG. 16, the type of contact of the portions of optical element retaining head 201 that comes into contact with the surface of optical element array sheet 101 is a surface contact in these areas, whereby the holding strength upon optical element array sheet 101 exercised by optical element retaining head 201 increases.

Figure 18A:
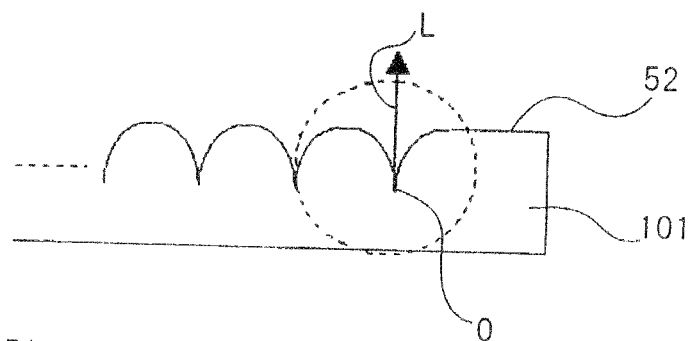
FIGS. 18A and 18B are sectional views showing the shape of the trough of the optical element array sheet of the first embodiment.
Figure 18B:
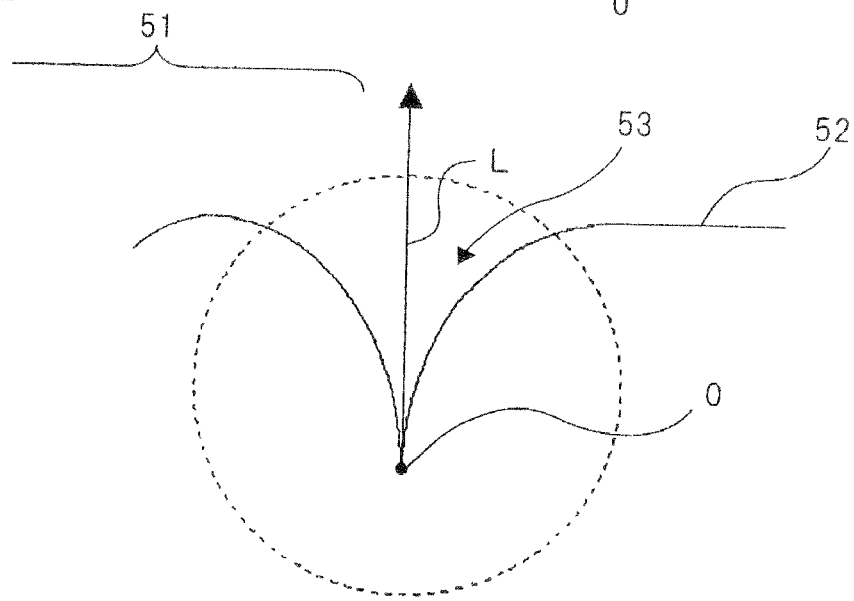

FIG. 18A is a sectional view showing the vicinity of the flat portion and the outer end of the optical element array in optical element array sheet 101 of the present embodiment. FIG. 18B is an enlarged view of the trough located at the border of the flat portion and the outer end of the optical element array. As shown in FIGS. 18A and 18B, the shape of trough 53 is formed with line symmetry with respect to reference line L that extends in the thickness direction of optical element array sheet 101 and with the bottom of trough 53 as point of origin O.

As a result, the occurrence of cracks due to stress concentration upon trough 53 is suppressed because the occurrence of distorted deformation in optical element array sheet 101 is suppressed despite the application of pressure to the surface of optical element array sheet 101 when bonding optical element array sheet 101 and a display panel. In addition, the side-wall on the second-area side of trough 53 may be formed with at least an inclined surface with respect to reference line L to enable a suppression of the occurrence of cracking at trough 53. Although a configuration was adopted in the present embodiment in which optical elements with a round shape are provided in first area 51, the present invention is not limited to this form. Essentially, trough 53 may be formed with a V-shaped profile in which the side-wall on the side of first area 51 and the side-wall on the side of second area 52 are both inclined with respect to reference line L.

In addition, the thickness of the flat portions of optical element array sheet 101 is preferably equal to the thickness of the optical element array, i.e., the thickness at each apex of the curved surface of each optical element in order to apply pressure evenly in the direction of the surface of optical element array sheet 101 when optical element array sheet 101 is bonded to a display panel. In other words, by making the thicknesses of first area 51 and second area 52 equal, the pressure on the opposing side-walls in trough 53 acts uniformly to realize a further suppression of the occurrence of cracks in trough 53. In addition, in optical element array sheet 101 of the present embodiment, the thickness is formed to the order of, for example, 0.1 mm to 0.3 mm.

Figure 19:
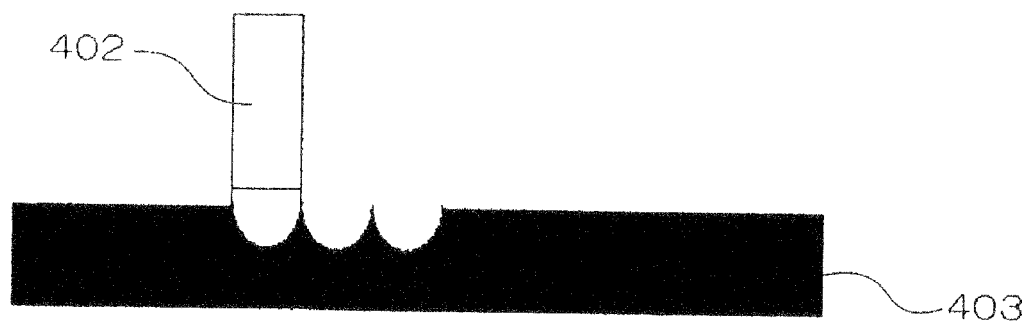
FIG. 19 is a sectional view showing a fabrication step of a die for forming the optical element array sheet of the first embodiment.

FIGS. 19, 20, and 21A-21C show the method of fabricating the optical element array sheet of the present embodiment. FIG. 19 is a sectional view showing the fabrication steps of the molding die for forming the optical element array sheet of the present embodiment.

Figure 20:
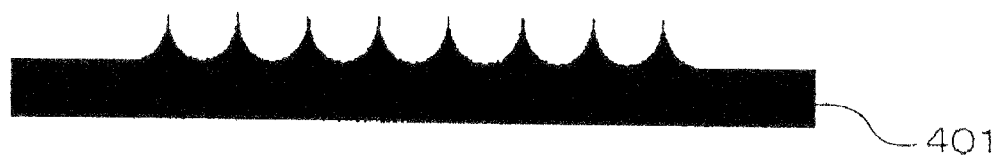
FIG. 20 is a sectional view showing a die for forming the optical element array sheet of the first embodiment.

As shown in FIG. 19, molding die 401 that is made of metal is fabricated by using cutting tool 402 to cut constituent material 403 of the molding die to a prescribed shape. At this time, a single-point tool having dimensions that correspond to the outer shape of the optical element that is the object of forming is provided on the tip of cutting tool 402. This cutting tool 402 is then used to carry out a cutting process on constituent material 403 at a feed pitch that corresponds to first period T, whereby the first pattern corresponding to first area 51 is formed at period T in constituent material 403. Next, as shown in FIG. 20, the same cutting tool 402 or another cutting tool is used to process the flat portions as the second pattern in constituent material 403 at positions that correspond to second areas 52 that are the outer ends of optical element array sheet 101 to obtain the molding die.

Using this type of molding die to form optical element array sheet 101 facilitates the fabrication of the molding die and enables the fabrication of optical element array sheet 101 by a molding die of a precise shape. In addition, because the same cutting tool is used to process the molding die in the present embodiment, the processing accuracy of the optical elements that are formed by this molding die can be improved.

Figure 21A:
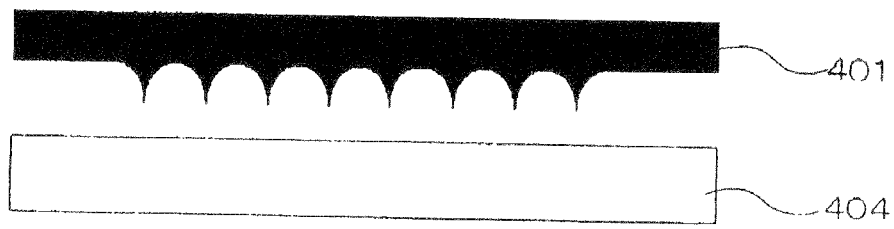
FIGS. 21A-21C are sectional views showing the fabrication steps of the optical element array sheet of the first embodiment that use the molding die shown in FIG. 20.
Figure 21B:
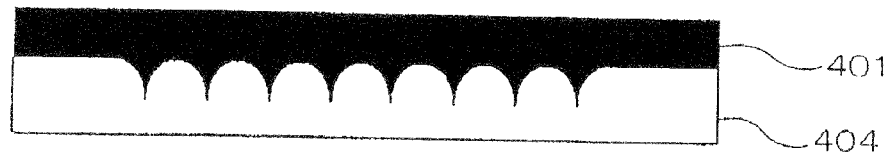
Figure 21C:
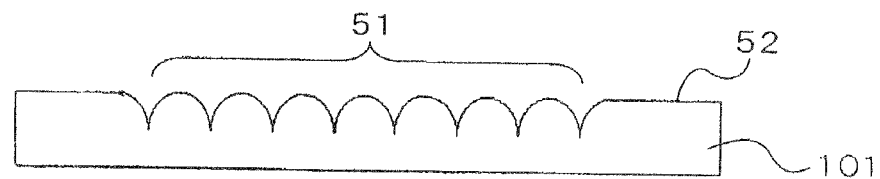

FIGS. 21A-21C are sectional views showing the fabrication steps of optical element array sheet 101 that uses molding die 401. As shown in FIGS. 21A and 21B, molding die 401 is pressed into material 404 of optical element array sheet 101 while heat is applied. After material 404 is formed, molding die 401 is removed from material 404 to form optical element array sheet 101 as shown in FIG. 21C. Here, a material that transmits light of at least a portion of the wavelength within the range of 400 nm-800 nm may be used as material 404 of optical element array sheet 101, a plastic typically being employed. Examples of such a plastic include, for example, engineering plastics such as polymethyl methacrylate, cyclopolyolefin, and polycarbonate.

FIGS. 21A-21C give a schematic representation of a hot press forming method that uses a molding die, but the optical element array sheet may be fabricated using an injection molding method that uses a similar molding die or by a transfer forming method by means of a thermoplastic resin or a photosensitive resin.

Figure 1:
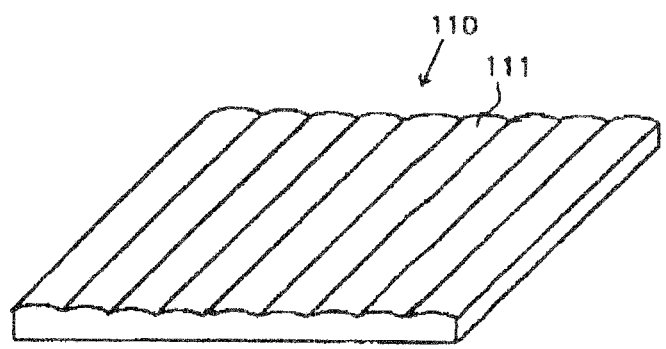
FIG. 1 is a perspective view giving a schematic representation of a lenticular lens sheet that relates to the present invention.
Figure 2:
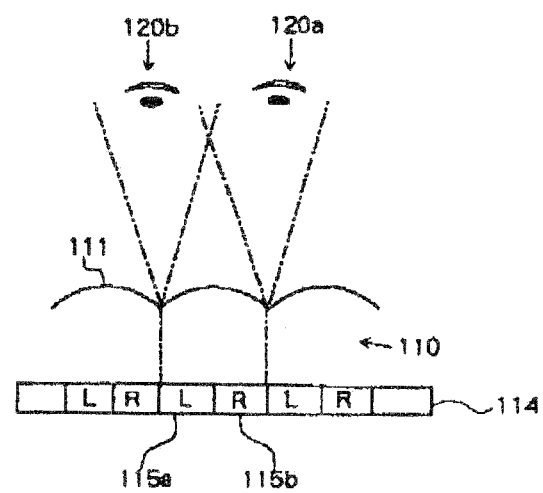
FIG. 2 is a schematic view showing an example of the configuration of a display device that uses the lenticular lens sheet that relates to the present invention and a three-dimensional display method.
Figure 3:
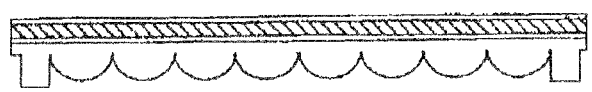
FIG. 3 is a sectional view showing the lenticular lens that relates to the present invention.
Figure 4A:
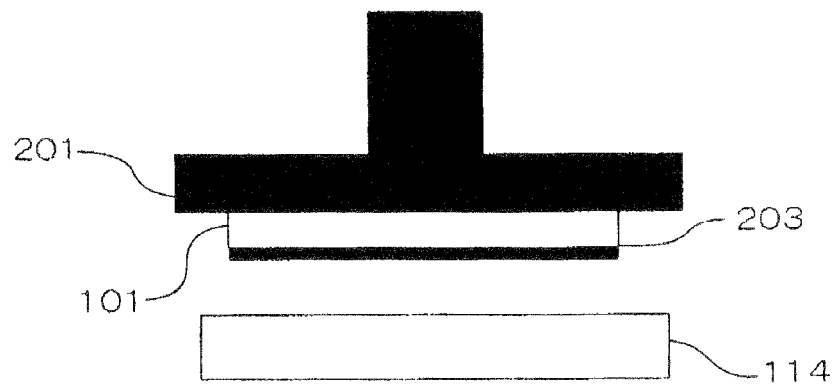
FIGS. 4A and 4B show steps of using an optical element retaining head to bond an optical element array sheet to a display panel.
Figure 4B:
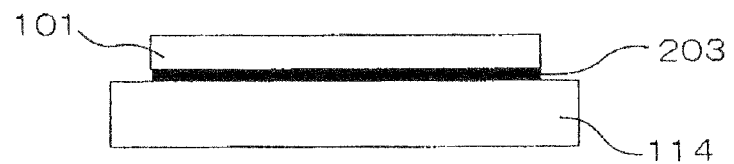
Figure 6A:
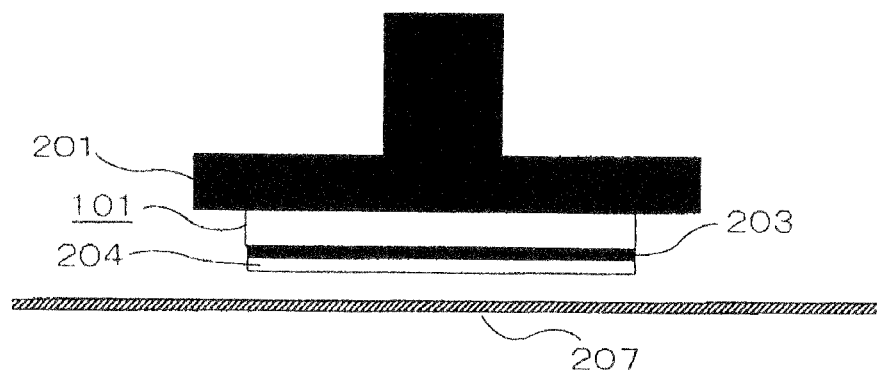
FIGS. 6A and 6B show the state in which the optical element array sheet is held on the optical element retaining head before peeling off a protective sheet.
Figure 6B:
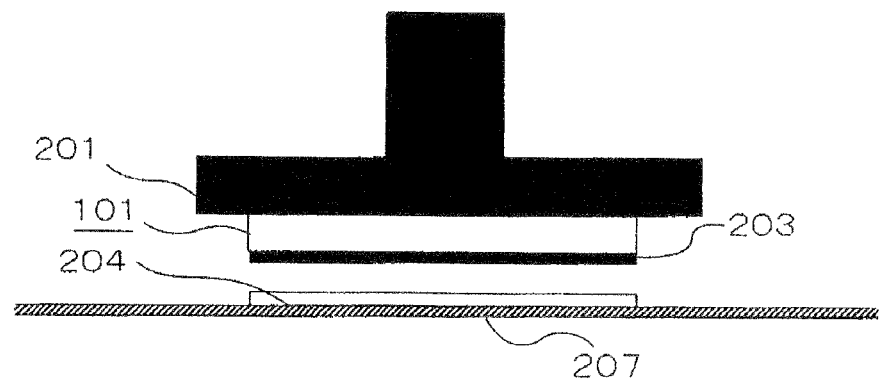
Figure 7:
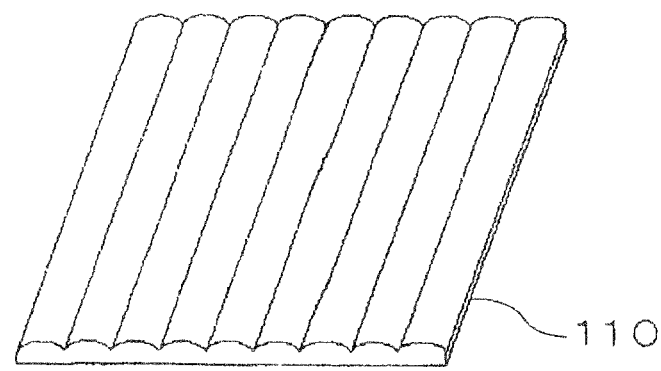
FIG. 7 is a perspective view showing a lenticular lens that relates to the present invention.
Figure 8:
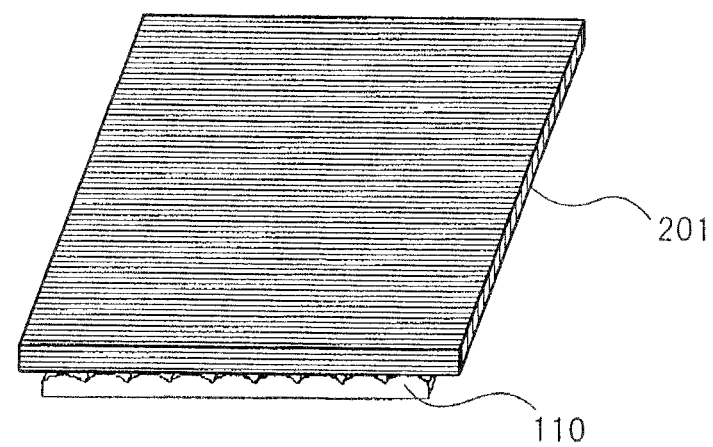
FIG. 8 is a perspective view showing the state in which a lenticular lens that relates to the present invention is held on an optical element retaining head.
Figure 9:
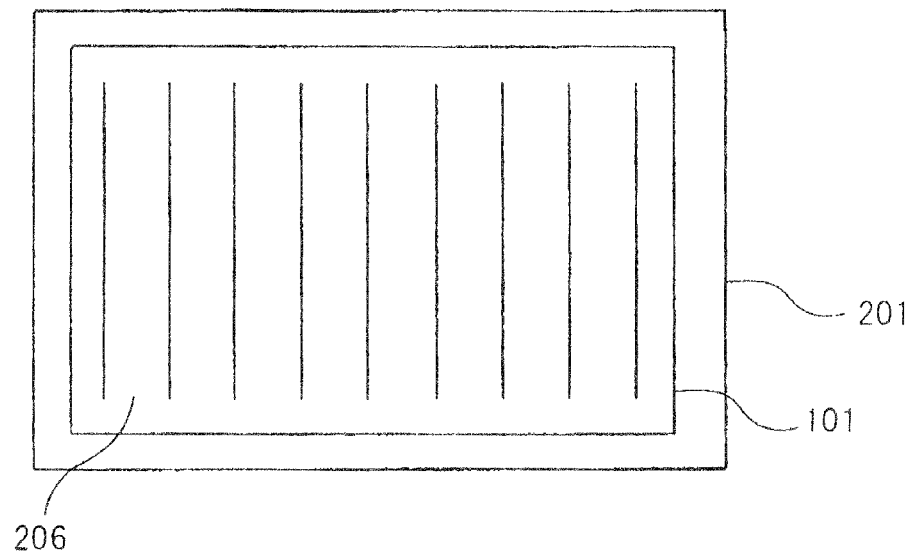
FIG. 9 is a plan view showing the contact surface between a lenticular lens that relates to the present invention and an optical element retaining head when the lenticular lens is held by the optical element retaining head.
Figure 10:
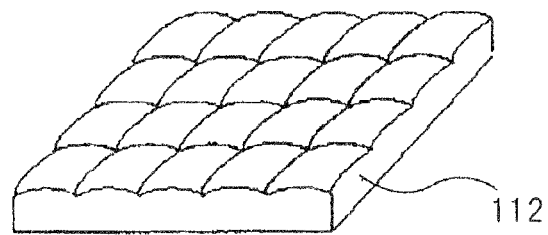
FIG. 10 is a perspective view showing a fly-eye lens that relates to the present invention.
Figure 11:
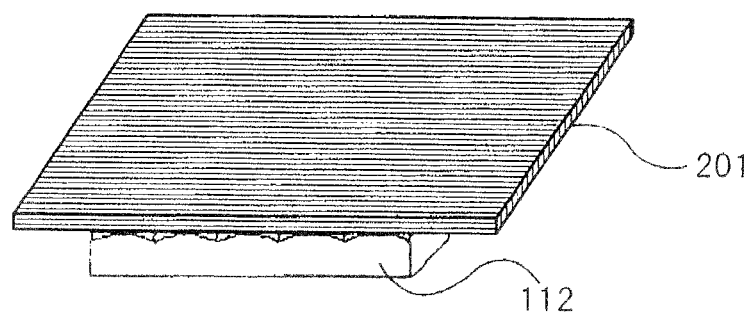
FIG. 11 is a perspective view showing the state in which the fly-eye lens that relates to the present invention is held by an optical element retaining head.
Figure 12:
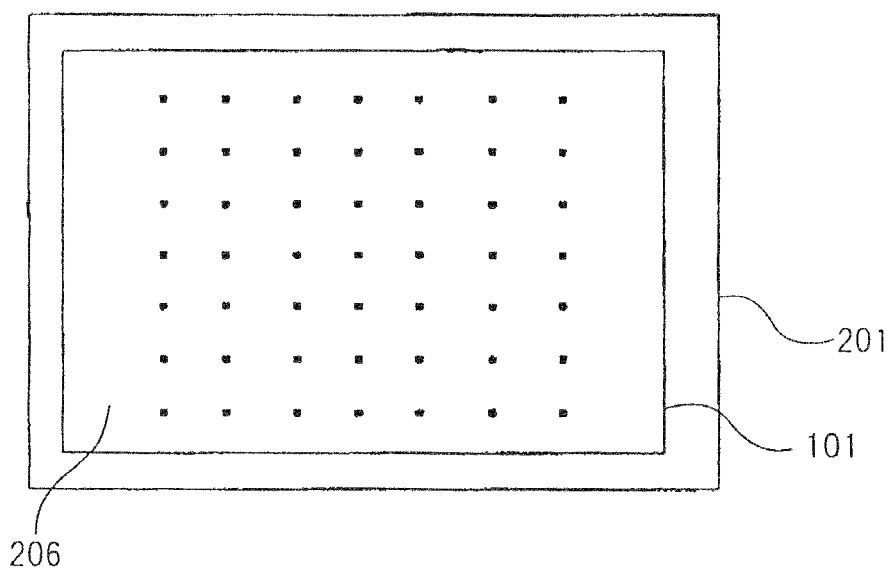
FIG. 12 is a plan view showing the contact surface between the fly-eye lens that relates to the present invention and the optical element retaining head when the fly-eye lens is held by the optical element retaining head.
Figure 13A:
FIGS. 13A and 13B show states in which a crack occurs in the peripheral edge portion of the lenticular lens that relates to the present invention.
Figure 13B:
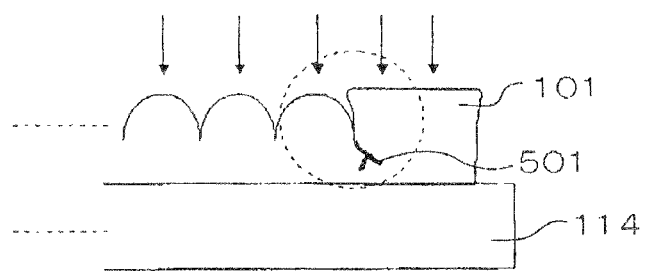

As shown in FIGS. 4A and 4B, optical element array sheet 101 that has been formed using molding die 401 is bonded to display panel 114 using optical element retaining head 201. At this time, in the step of removing protective sheet 204 such as shown in FIGS. 6A and 6B, protective sheet 204 is preferably peeled from the side of one end of optical element array sheet 101 on which a flat portion, which is second area 52, is formed and toward the side of first region 51.

In the present embodiment, detaching protective sheet 204 from the portion in which the type of contact of the contact portion between optical element array sheet 101 and optical element retaining head is surface contact can suppress the occurrence of detachment errors in the step of bonding optical element array sheet 101 to display panel 114.

The material of the adhesive layer for bonding the display panel and the optical element array sheet is preferably a photo-setting resin that can transmit visible light or a transparent double-sided adhesive film.

Figure 22:
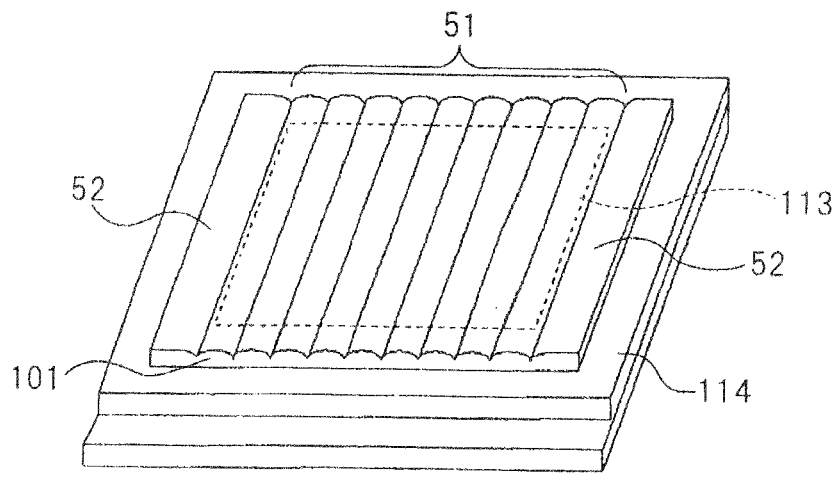
FIG. 22 is a perspective view showing the state in which the optical element array sheet of the first embodiment is bonded to a display panel.

FIG. 22 is a perspective view showing the state in which optical element array sheet 101 is mounted on display panel 114. The flat portions of optical element array sheet 101 are arranged in non-display areas on the outer sides of display area 113 of display panel 114.

Figure 23:
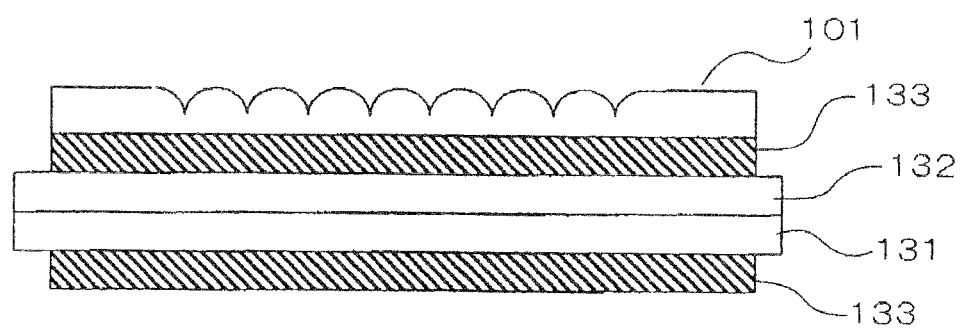
FIG. 23 is a sectional view showing the display device of the first embodiment.

FIG. 23 is a sectional view showing a configuration in which a liquid crystal display device is used as the display panel. As shown in FIG. 23, a configuration is adopted in which polarizing plate 133, drive substrate 131, opposite substrate 132, polarizing plate 133, and optical element array sheet 101 are arranged in the order of the light path from the light-incidence side of light from the backlight light source (not shown). Accordingly, optical element array sheet 101 is arranged on the uppermost surface of the display device in FIG. 23.

As described hereinabove, the present embodiment can prevent damage to the optical element array when optical element array sheet 101 is bonded to display panel 114 and can thus improve the reliability of the fabrication process.

Accordingly, the present embodiment can improve the yield of the fabrication process and enables mounting of optical element array sheet 101 to display panel 114 with high accuracy.

Second Embodiment

Figure 24:
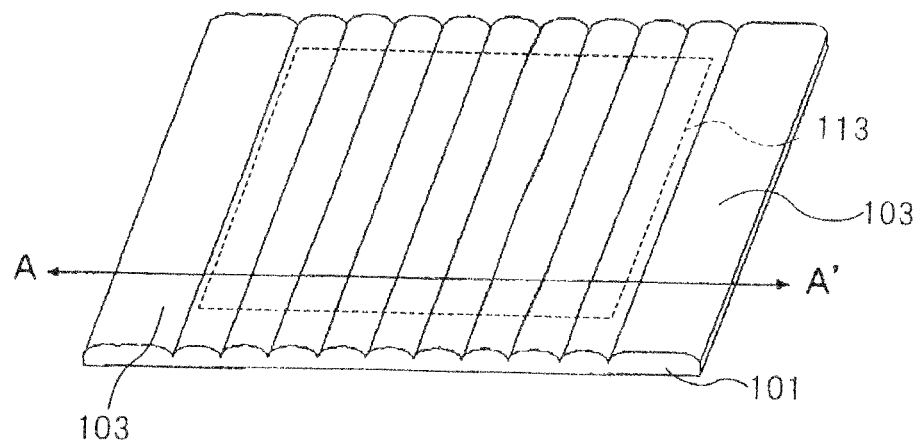
FIG. 24 is a perspective view showing the optical element array sheet of the second embodiment.
Figure 25:
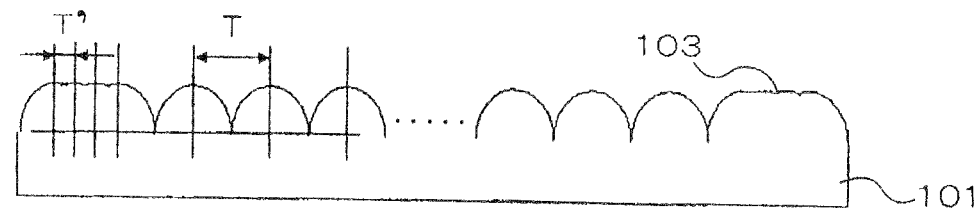
FIG. 25 is a sectional view taken along line A-A' of the optical element array sheet shown in FIG. 24.
Figure 26:
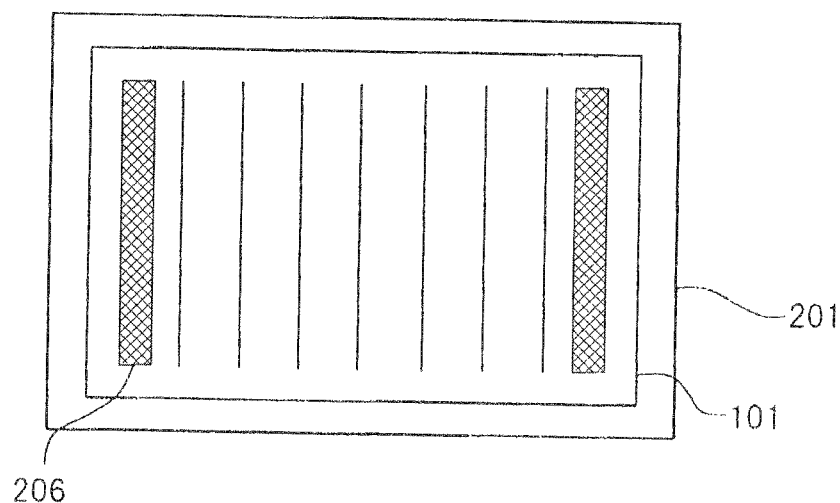
FIG. 26 is a plan view showing the contact surface between the optical element array sheet of the second embodiment and the optical element retaining head when the optical element array sheet is held by the optical element retaining head.

FIG. 24 shows a perspective view of the optical element array sheet of the second embodiment, and FIG. 25 shows a sectional view taken along line A-A' of FIG. 24. FIG. 26 is a plan view showing contact surface 206 between optical element retaining head 201 and optical element array sheet 101 of the present embodiment when optical element array sheet 101 is held by optical element retaining head 201.

As shown in FIG. 24, optical element array portion 103 is formed on the outer ends of optical element array sheet 101 at a second period T' for which the period differs from that of the optical element array that is formed at a first period T in the portion that corresponds to display area 113 of display panel 114. As shown in FIG. 25, the optical elements that are arranged at the first period T and the optical elements that are arranged at the second period T' are optical elements of the same shape having equal curvature radius but for which the periods of the positions of the centers of curvature are different from each other.

Figure 27:
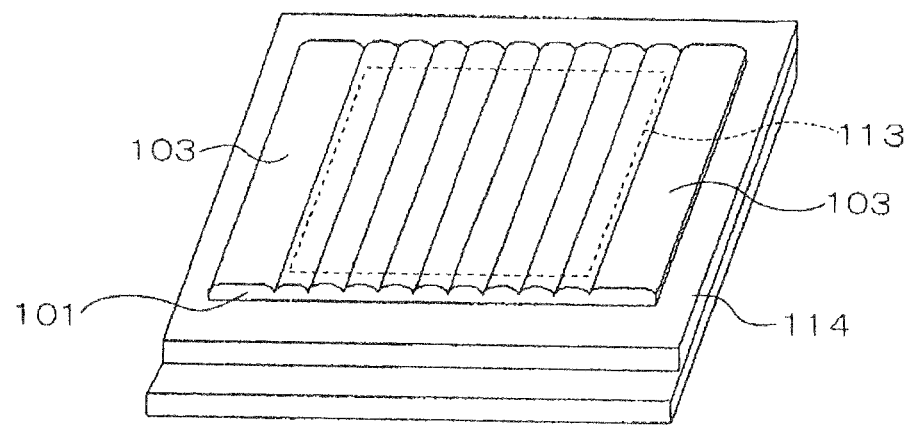
FIG. 27 is a perspective view showing the state in which the optical element array sheet of the second embodiment is bonded to a display panel.

FIG. 27 is a perspective view showing the state in which optical element array sheet 101 of the present embodiment is mounted on display panel 114. Optical element array portion 103 in which arrangement is at the second period T' on optical element array sheet 101 is arranged in a non-display area on the outer sides of display area 113 of display panel 114.

Due to optical element array portion 103 formed at the second period T', the contact area with optical element retaining head 201 increases and the holding power of optical element array sheet 101 therefore increases. In addition, as shown in FIG. 25, trough 53 that is located at the border of the neighboring edges of the optical element array that is formed at first period T and the optical element array that is arranged at second period T' is shaped with line symmetry with respect to reference line L that extends in the thickness direction of optical element array sheet 101 with the bottom of trough 53 as the point of origin O. As a result, in the step of bonding optical element array sheet 101 to display panel 114, it is difficult for optical element array sheet 101 to be deformed when pressure is applied to it. Accordingly, the occurrence of cracks caused by stress concentration in the trough can be suppressed.

Figure 28:
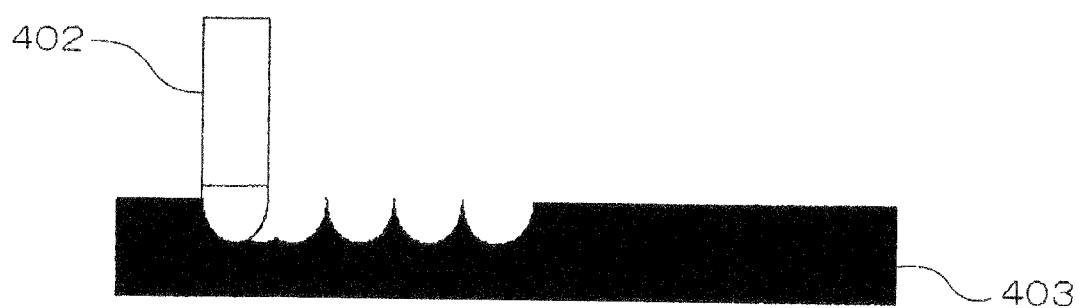
FIG. 28 is a sectional view showing the fabrication steps of a molding die for forming the optical element array sheet of the second embodiment.
Figure 29:
FIG. 29 is a sectional view showing the molding die for forming the optical element array sheet of the second embodiment.

FIG. 28 is a schematic view showing the fabrication steps of a molding die for forming optical element array sheet 101 of the present embodiment. Constituent material 403 of the molding die is cut to a prescribed shape by cutting tool 402, and molding die 401 is made from metal. At this time, a single-point tool having dimensions that correspond to the outer shape of the optical element that is the object of forming is provided on the tip of the cutting tool. This cutting tool is then used to carry out the cutting process of constituent material 403 at a feed pitch that corresponds to the first period T as shown in FIG. 28. A first pattern that corresponds to first area 51 is thus formed at the first period T in constituent material 403. In addition, cutting tool 402 that is the same as in the above-described process is further used to carry out a cutting process at a feed pitch that corresponds to the second period T' in constituent material 403 at positions that correspond to second areas 52 which are the outer ends of optical element array sheet 101, as shown in FIG. 29. In this way, a second pattern that corresponds to second area 52 is formed in constituent material 403 at the second period T' to obtain a molding die.

Figure 30:
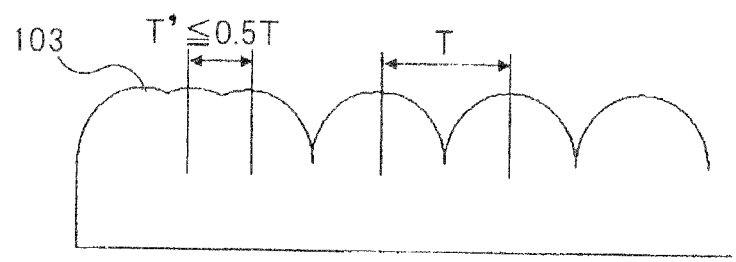
FIG. 30 is a sectional view showing an optical element array that is formed at the second period on the optical element array sheet of the second embodiment.

As shown in FIG. 30, if the second period T' is half of the first period T or less (T'≦0.5 T), the area of the portion where optical element retaining head 201 and optical element array sheet 101 come into contact with each other is at least twice that of the portion of first period T. As a result, the holding power can be kept sufficient. Still more preferably, if the second period T' is no greater than one-fifth that of the first period T (T'≦0.2 T), the contact area will be at least five times that of the configuration relating to the present invention and the outer area of optical element array sheet 101 can be reduced to one-half or less that of the related configuration. As a result, when optical element array sheet 101 is used to construct a display device, the width of the frame at the periphery of display area 113 can be made narrower.

Figure 31:
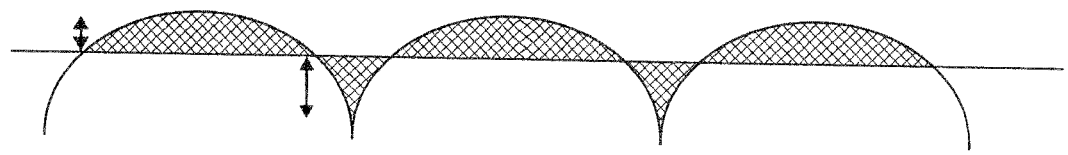
FIG. 31 shows the method of computing surface roughness of an optical element array that is formed at the second period on the optical element array sheet of the second embodiment.

When a lenticular lens is used, the arithmetic mean roughness of the surface of the optical element array that is formed at the second period T' is no greater than 0.6 μm, and more preferably, no greater than 0.1 μm, the type of contact in the contact portion that comes into contact is substantially a surface contact, whereby the same effect can be obtained as a configuration in which flat portions are formed in the outer end portions of the optical element array sheet and the holding power can be kept sufficient. The arithmetic mean roughness of the surface at this time is a value obtained by drawing a mean line of the height of peaks and troughs of adjacent optical elements and taking the average of the sum of the absolute values of the deviation from this mean line to the surface of the optical elements as the averaged value, as shown in FIG. 31.

As a more specific example, a case will be considered in which the first period T of the cylindrical lens is 150 μm and the curvature radius of the lens is 300 μm. The area of contact between a lenticular lens that uses this cylindrical lens and optical element retaining head 201 is in the order of 20% of that of a case in which the entire surface is flat, and the arithmetic mean roughness Ra of the surface in this case is in the order of 2 μm.

When the second period T' of the cylindrical lens is set to 75 μm, which is 0.5 T, the area of contact between the optical element retaining head 201 and the lenticular lens is doubled, and the holding strength realized by optical element retaining head 201 is increased. In this case, the arithmetic means roughness Ra of the surface is 0.6 μm. In addition, when the second period T' is set to 30 μm, which is 0.2 T, the area of contact is increased by a multiple of 5, and the area of contact is equivalent to full contact. The arithmetic mean roughness Ra of the surface in this case is 0.1 μm.

Third Embodiment

Figure 32:
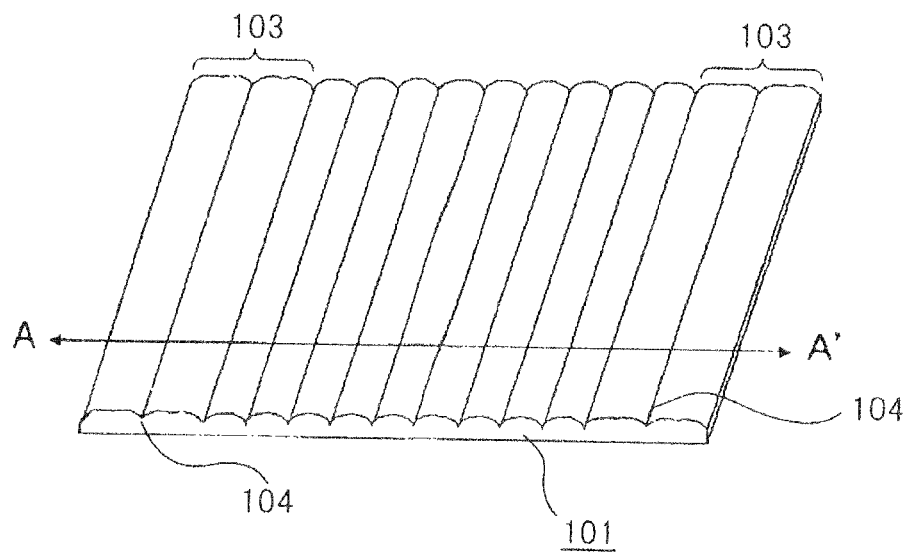
FIG. 32 is a perspective view showing the optical element array sheet of the third embodiment.
Figure 33:
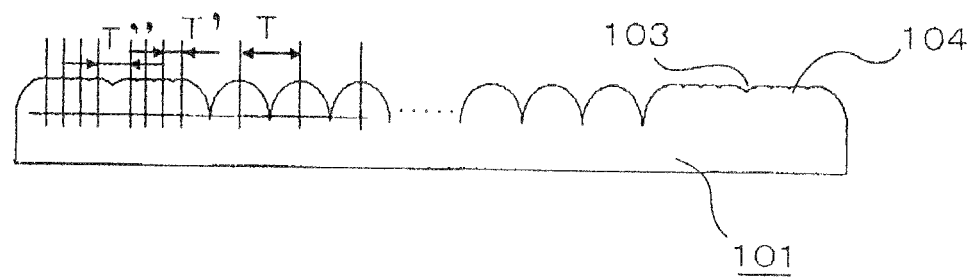
FIG. 33 is a sectional view taken along line A-A' of the optical element array sheet shown in FIG. 32.
Figure 34:
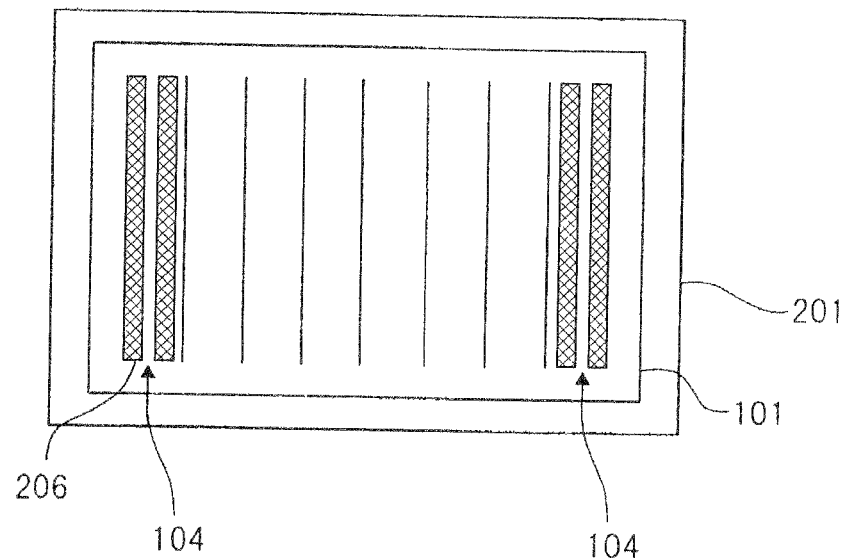
FIG. 34 is a plan view showing the contact surface between the optical element array sheet of the third embodiment and the optical element retaining head when the optical element array sheet is held by the optical element retaining head.

FIG. 32 shows a perspective view of the optical element array sheet of the third embodiment, and FIG. 33 shows a sectional view taken along line A-A' of FIG. 32. FIG. 34 is a plan view showing contact surface 206 between optical element retaining head 201 and optical element array sheet 101 of the present embodiment when optical element array sheet 101 is held by optical element retaining head 201.

As in the second embodiment, optical element array portion 103 is formed on the outer ends of optical element array sheet 101 of the present embodiment at a second period T' that is shorter than the period of the optical element array formed at the first period T corresponding to the display area of display panel 114 as shown in FIGS. 32 and 33. Optical elements are further formed at a third period T" having a longer period than the second period T' in a part of optical element array portion 103 that is formed at the second period T', and this portion is used as positioning mark that is used when bonding together display panel 114 and optical element array sheet 101. In other words, a blank can be produced in a part of the area of contact surface 206 between optical element array sheet 101 and optical element retaining head 201 as shown in FIG. 34, and this blank portion can be used as positioning mark 104.

Figure 35:
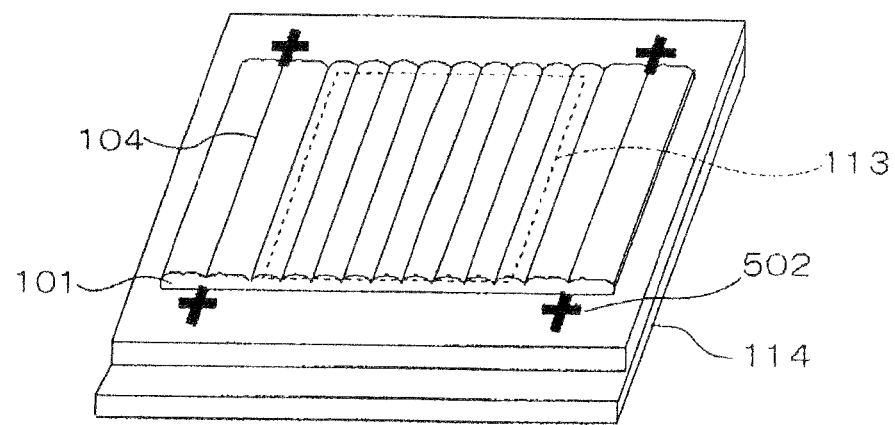
FIG. 35 is a perspective view showing the state when the optical element array sheet of the third embodiment is bonded to a display panel.

FIG. 35 is a perspective view showing the state in which optical element array sheet 101 of the present embodiment is mounted on display panel 114. Of optical element array sheet 101, optical element array portion 103 that is formed at the second period T' is arranged in a nondisplay area outside display area 113 of display panel 114. Although positioning marks 502 are arranged at positions that correspond to marks 104 that are formed at third period T" on display panel 114 in FIG. 35, these marks 502 may be provided at any position on display panel 114.

As in the case of the second embodiment, in the molding die for forming optical element array sheet 101 of the present embodiment, a first pattern that corresponds to first area 51 is formed at the first period T and a second pattern that corresponds to second area 52 is formed at the second period T' in constituent material 403. Still further, a cutting tool is used to cut a third pattern at a third period T" that is longer than the second period T' within the second pattern in constituent material 403 to obtain the molding die.

According to the present embodiment, high-accuracy bonding can be realized by overlaying the positioning marks of display panel 114 and the marks provided in optical element array portion 103 that is formed at the third period T" of optical element array sheet 101, whereby an improvement can be achieved in the picture quality of a display device.

Fourth Embodiment

Figure 36:
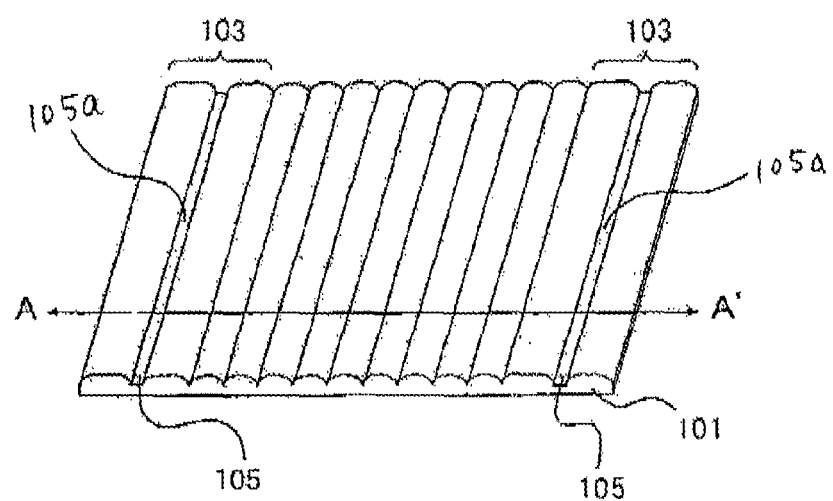
FIG. 36 is a perspective view showing the optical element array sheet of the fourth embodiment.
Figure 37:
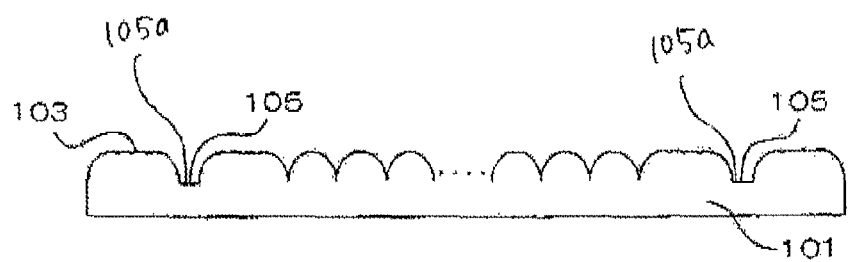
FIG. 37 is a sectional view taken along line A-A' of the optical element array sheet shown in FIG. 36.

FIG. 36 shows a perspective view of the optical element array sheet of the fourth embodiment, and FIG. 37 shows a sectional view taken along line A-A' of FIG. 36. The contact surface between optical element array sheet 101 of the present embodiment and optical element retaining head 201 when optical element array sheet 101 is held by optical element retaining head 201 is equivalent to the plan view that shows contact surface 206 between optical element retaining head 201 and optical element array sheet 101 of the third embodiment shown in FIG. 34. However, the present embodiment enables a broadening of the area of the blank portion compared to the third embodiment.

In the present embodiment, the third period T" is made even larger than in the third embodiment. In the present embodiment, making the third period T" greater than the curvature radius of optical elements forms depression 105, which includes flat surface 105a in which a period is not formed, on the outer ends of optical element array sheet 101. In other words, depression 105 is formed in optical element array portion 103 formed at the second period T'. This depression 105 is of a configuration that includes, a bottom surface in which flat surface 105a that is orthogonal to the thickness direction of optical element array sheet 101 formed, and side walls that have curved surfaces as inclined surfaces that are inclined with respect to a plane that is orthogonal to this flat surface.

According to the present embodiment, not only the blank portions of the contact surfaces shown in FIG. 34 but also depression 105 itself can be used as positioning marks. In the present embodiment, flat surface 105a was formed on the bottom surface of depression 105 for augmenting visibility as a mark, but the present invention is not limited to this form, and the bottom surface may also be formed as another shape such as a curved surface. However, when the prevention of the occurrence of cracks or the workability of depression 105 is taken into consideration, a configuration in which the bottom surface of depression 105 is formed flat is preferable.

Figure 38:
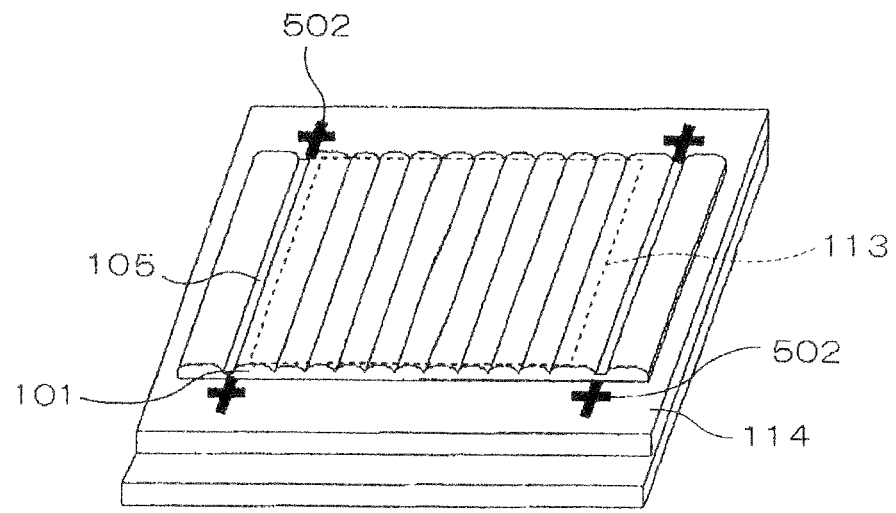
FIG. 38 is a perspective view showing the state in which the optical element array sheet of the fourth embodiment is bonded to a display panel.

FIG. 38 is a perspective view showing the state in which optical element array sheet 101 of the present embodiment is mounted on display panel 114. As shown in FIG. 38, optical element array portions 103 formed at the second period T' are arranged on optical element array sheet 101 in nondisplay areas outside display area 113 of display panel 114. In the present embodiment, positioning marks 502 are arranged at positions that correspond to depression 105 on display panel 114, but the present invention is not limited to these positions and positioning marks 502 may be provided at any positions on display panel 114.

Fifth Embodiment

Figure 39:
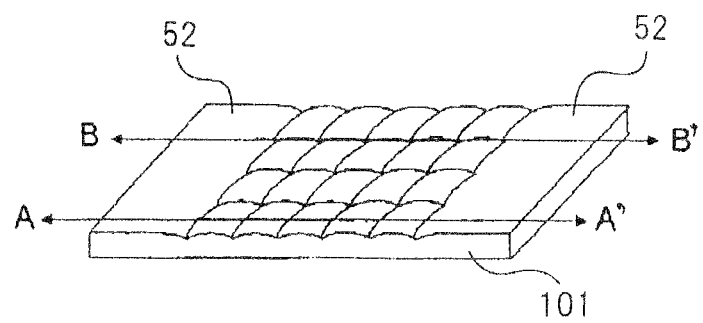
FIG. 39 is a perspective view showing the optical element array sheet of the fifth embodiment.
Figure 40:
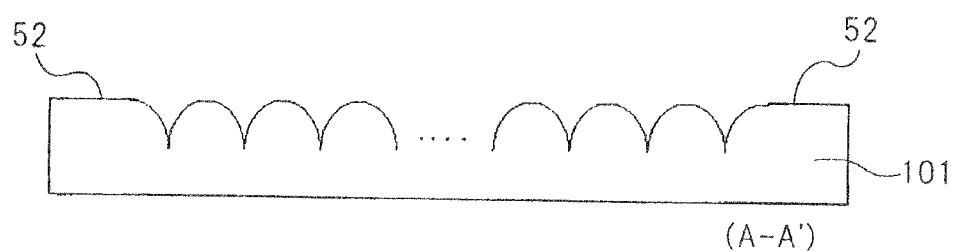
FIG. 40 is a sectional view taken along line A-A' of the optical element array sheet shown in FIG. 39.
Figure 41:
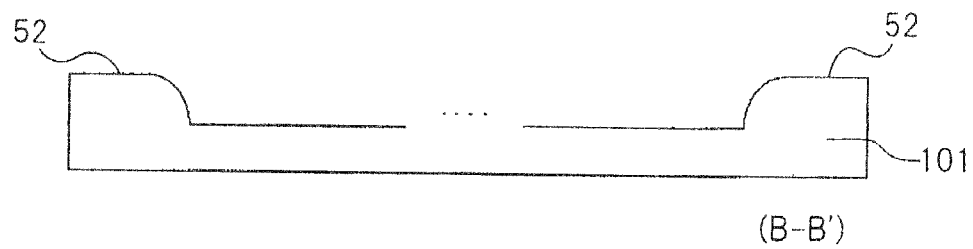
FIG. 41 is a sectional view taken along line B-B' of the optical element array sheet shown in FIG. 39.
Figure 42:
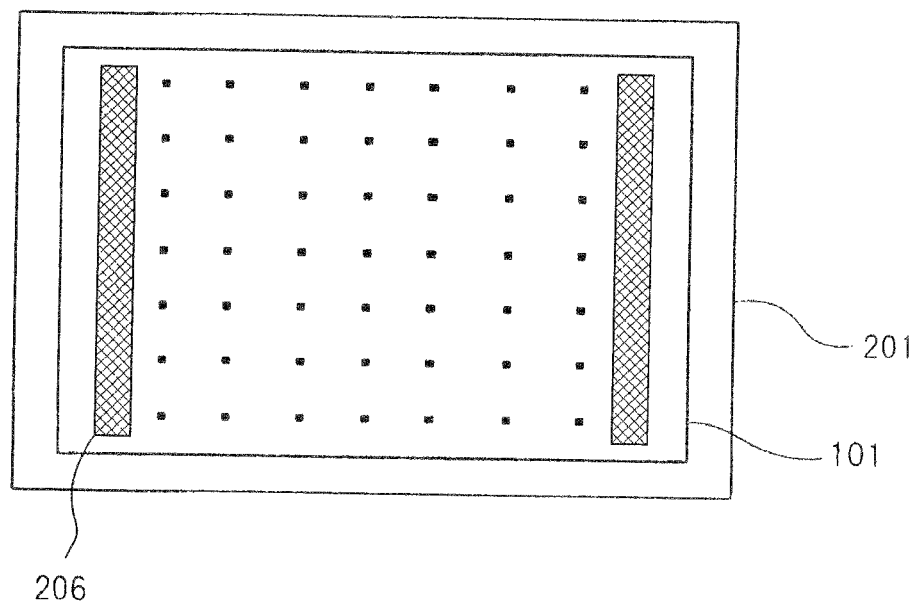
FIG. 42 is a plan view showing the contact surface between the optical element array sheet of the fifth embodiment and the optical element retaining head when the optical element array sheet is held by the optical element retaining head.

FIG. 39 shows a perspective view of the optical element array sheet of the fifth embodiment, FIG. 40 shows a sectional view taken along line A-A' of FIG. 39, and FIG. 41 shows a sectional view taken along line B-B' in FIG. 39. FIG. 42 is a plan view showing the contact surface between optical element array sheet 101 of the present embodiment and optical element retaining head 201 when optical element array sheet 101 is held by optical element retaining head 201.

Figure 43:
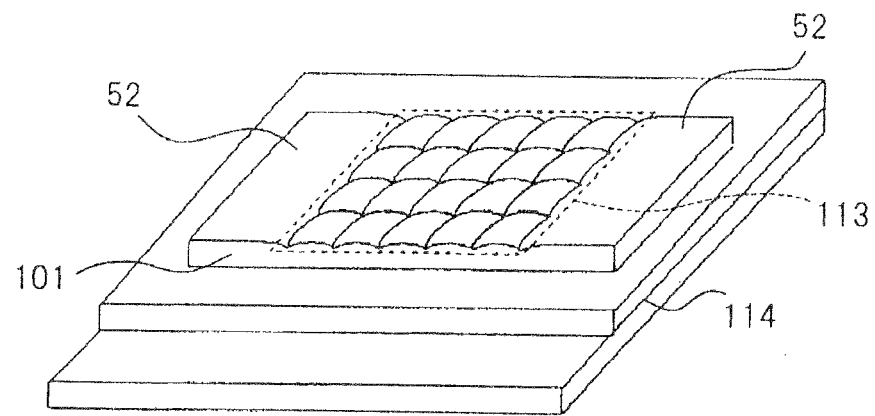
FIG. 43 is a perspective view showing the state in which the optical element array sheet of the fifth embodiment is bonded to a display panel.

FIG. 43 is a perspective view showing the state in which optical element array sheet 101 of the present embodiment is mounted on display panel 114. The flat portions provided on the outer ends of optical element array sheet 101 are arranged in non-display areas outside display area 113 of display panel 114.

In the present embodiment, fly-eye lenses are used as the optical elements, and the type of contact in portions corresponding to the display area of display panel 114 is point contact, as shown in FIG. 42. Compared to the type of contact between the display panel and the lenticular lens that relates to the present invention that was linear contact, the type of contact at the contact surfaces with display panel 114 in the present embodiment is surface contact, whereby the holding strength realized by optical element retaining head 201 can be increased.

Figure 44:
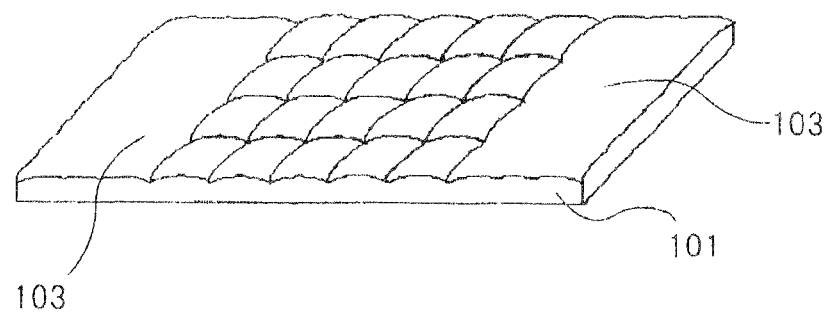
FIG. 44 is a perspective view showing the optical element array sheet of the fifth embodiment.

In the present embodiment, a configuration is adopted in which flat portions are formed at the outer ends of optical element array sheet 101, as in the first embodiment. In the present embodiment, optical element array portions 103 may also be formed at the second period T' at the outer ends of optical element array sheet 101 as shown in FIG. 44. Further, positioning marks may also be provided in the present embodiment by forming optical elements at the third period T" as in the third and fourth embodiments.

In fly-eye lenses, there are two arrangement directions in which the plurality of lenses is arranged: a direction parallel to the direction of line A-A' shown in FIG. 39 and a direction orthogonal to the direction of line A-A'. As a result, the first period T, second period T', and third period T" are set for each of these two arrangement directions of fly-eye lenses.

Sixth Embodiment

Figure 45:
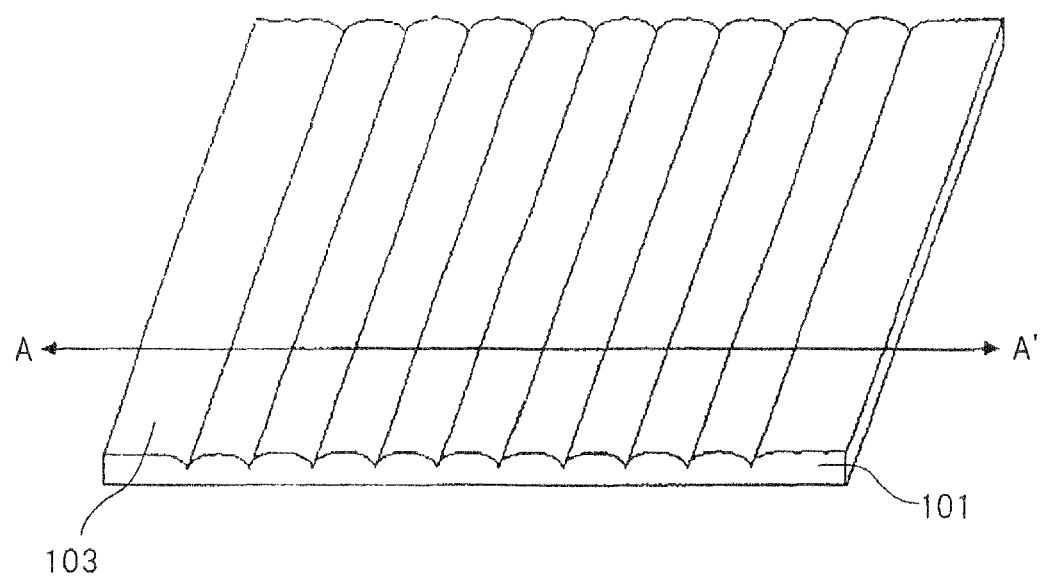
FIG. 45 is a perspective view showing the optical element array sheet of the sixth embodiment.
Figure 46:
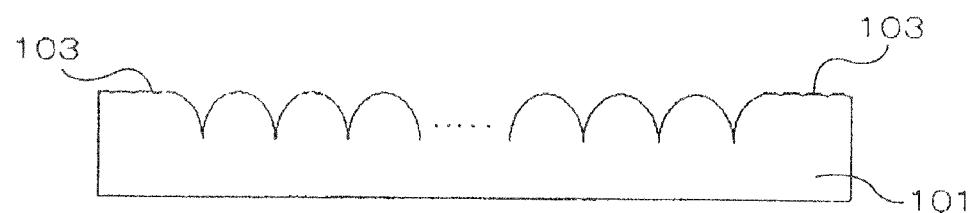
FIG. 46 is a sectional view taken along line A-A' of the optical element array sheet shown in FIG. 45.

Optical element array sheet 101 of the present embodiment is a lenticular lens that uses cylindrical lenses as shown in FIGS. 45 and 46, and as in the second to fifth embodiments, optical element arrays that are formed at the second period T' are arranged at the outer ends of optical element array sheet 101.

Figure 5A:
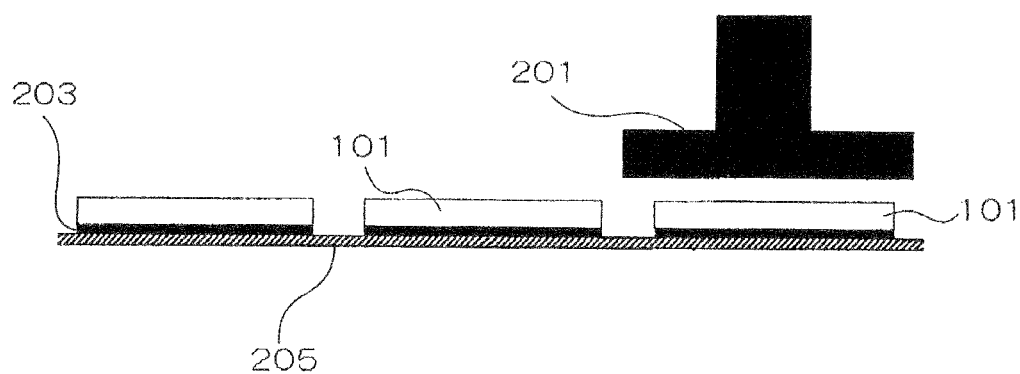
FIGS. 5A and 5B show steps of using the optical element retaining head to peel the optical element array sheet from a retaining sheet.
Figure 5B:
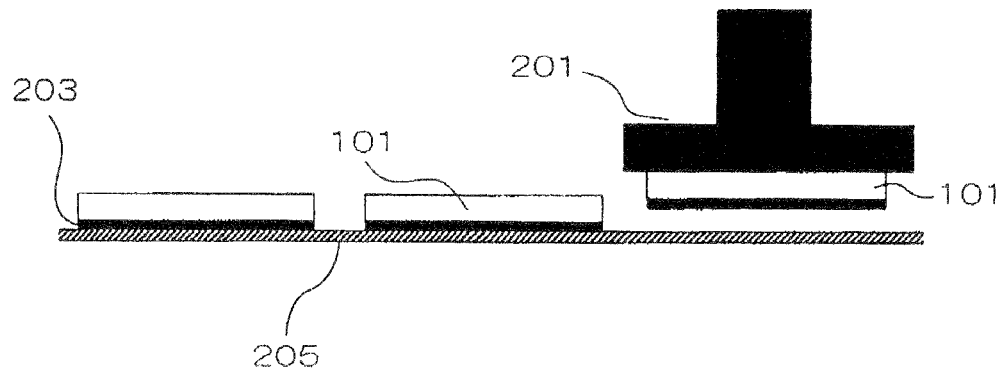

In the present embodiment as well, increasing the holding strength realized by optical element retaining head 201 at the outer ends of optical element array sheet 101 enables an improvement of reliability in detachment steps when detaching from a retaining sheet as shown in FIGS. 5A and 5B or when detaching a protective sheet as shown in FIGS. 6A and 6B.

Seventh Embodiment

Figure 47:
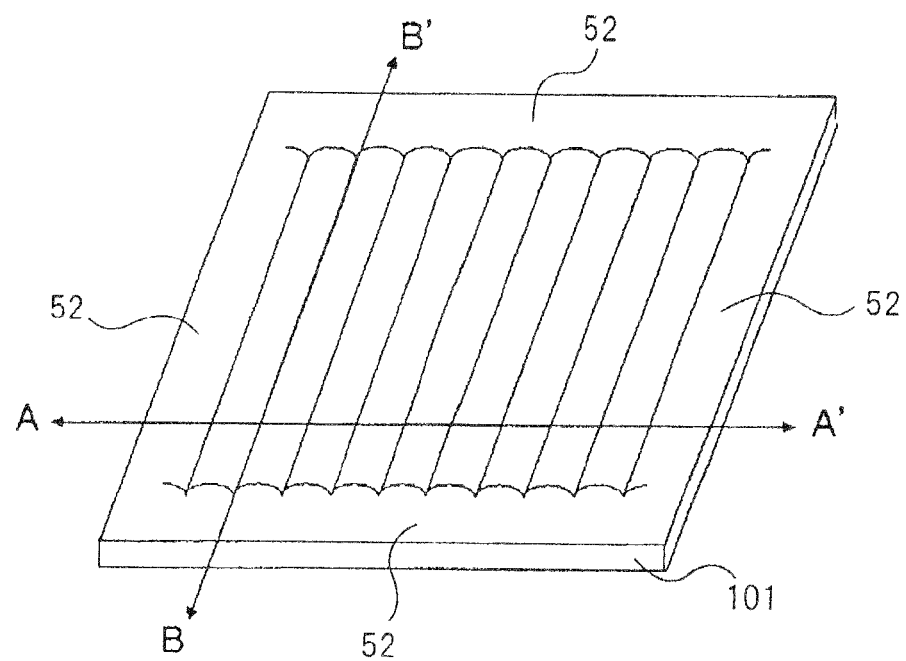
FIG. 47 is a perspective view showing the optical element array sheet of the seventh embodiment.
Figure 48:
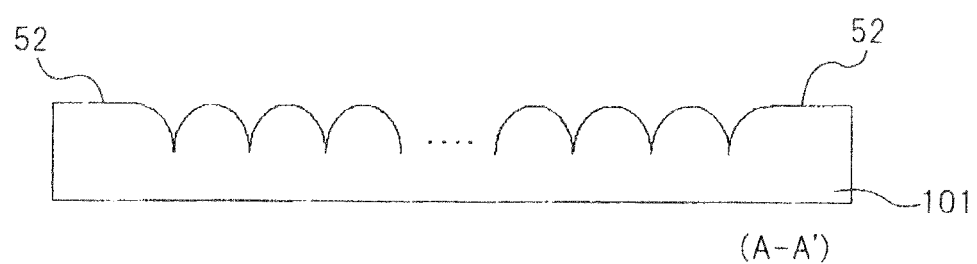
FIG. 48 is a sectional view taken along line A-A' of the optical element array sheet shown in FIG. 47.
Figure 49:
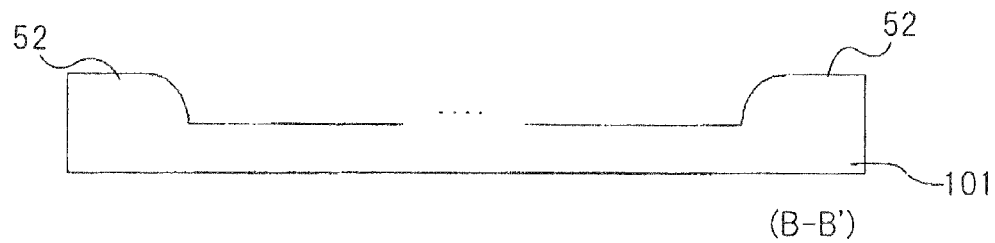
FIG. 49 is a sectional view taken along line B-B' of the optical element array sheet shown in FIG. 47.
Figure 50:
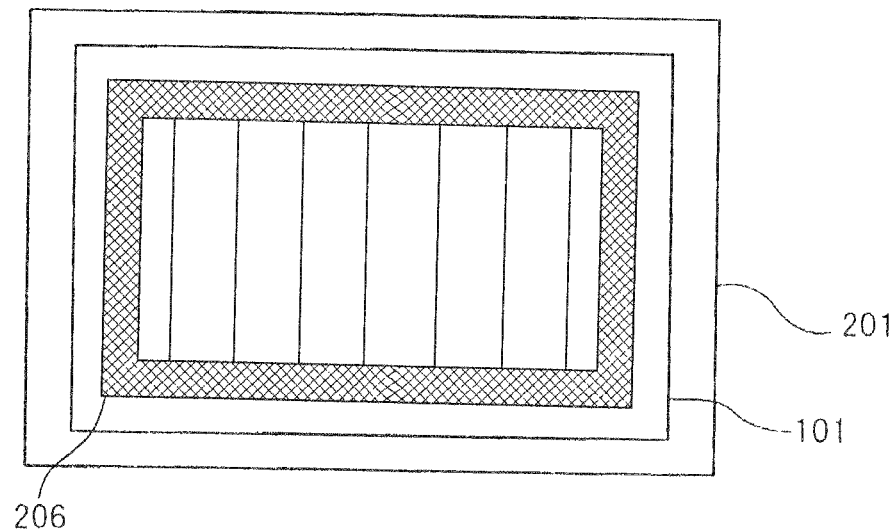
FIG. 50 is a plan view showing the contact surface between the optical element array sheet of the seventh embodiment and the optical element retaining head when the optical element array sheet is held by the optical element retaining head.

FIG. 47 is a perspective view showing the optical element array sheet of the seventh embodiment, FIG. 48 is a sectional view taken along line A-A' of FIG. 47, and FIG. 49 shows a sectional view taken along line B-B' of FIG. 47. FIG. 50 is a plan view showing the contact surface between optical element array sheet 101 of the present embodiment and optical element retaining head 201 when optical element array sheet 101 is held by optical element retaining head 201.

Figure 51:
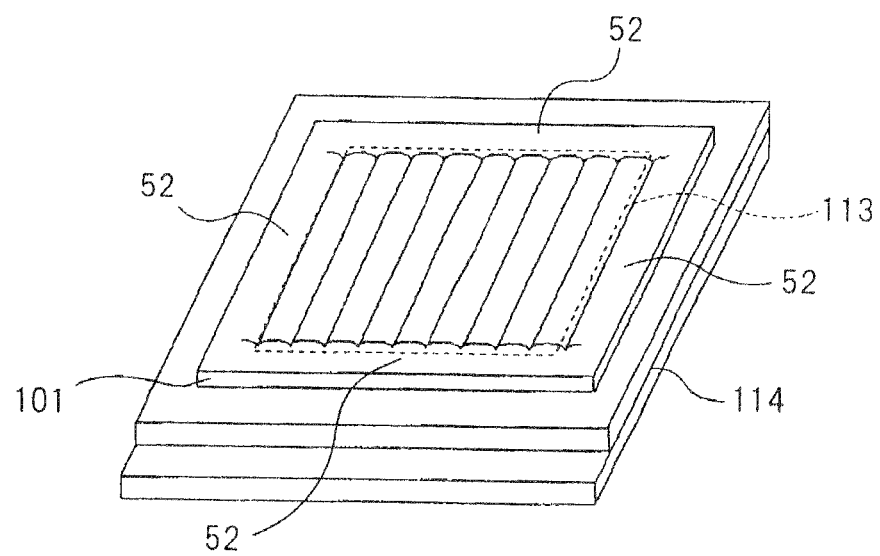
FIG. 51 is a perspective view showing the state in which the optical element array sheet of the seventh embodiment is bonded to a display panel.

FIG. 51 is a perspective view showing the state in which optical element array sheet 101 of the present embodiment is mounted on display panel 114. Flat portions of optical element array sheet 101 are arranged in nondisplay areas outside display area 113 of display panel 114.

In the first to sixth embodiments described hereinabove, configurations were adopted in which flat portions and optical element array portions 103 that are formed at the second period T' are formed only along the two sides of the periphery of optical element array sheet 101, but a configuration may also be adopted in which, as shown in FIG. 47, flat portions are formed around the periphery of optical element array sheet 101, i.e., on each of the four sides of the periphery. By means of this configuration, the holding strength realized by optical element retaining head 201 can be further increased.

Other Embodiments

Figure 52A:
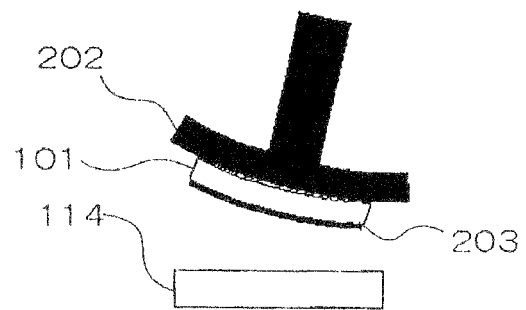
FIGS. 52A and 52B show steps of using a curved optical element retaining head to bond an optical element array sheet to a display panel.
Figure 52B:
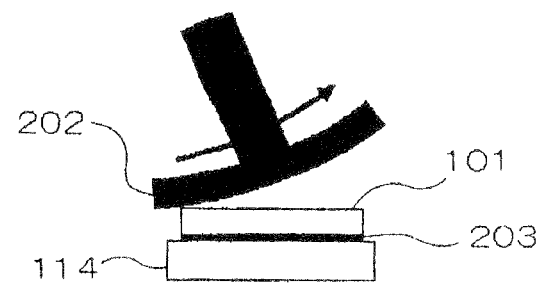

FIGS. 4A and 4B show steps in which optical element array sheet 101 is held on the flat holding surface formed on optical element retaining head 201 and, using this optical element retaining head 201, optical element array sheet 101 is bonded to display panel 114. However, the configuration of the optical element retaining head is not limited to the form shown in FIGS. 4A and 4B. As the optical element retaining head, curved optical element retaining head 202 in which the holding surface is formed with a prescribed curvature as shown in FIGS. 52A and 52B may also be adopted. In other words, optical element retaining head 202 may be used to hold optical element array sheet 101, and by turning optical element retaining head 202 with respect to display panel 114, optical element array sheet 101 may be bonded to display panel 114.

When optical element array sheet 101 and display panel 114 are bonded by using curved optical element retaining head 202, the occurrence of air pockets between optical element array sheet 101 and display panel 114 can be suppressed. In addition, because optical element array sheet 101 has some rigidity, optical element array sheet 101 is comparatively easy to detach from the holding surface of optical element retaining head 202 in curved optical element retaining head 202. As a result, the use of curved optical element retaining head 202 realizes an increase in the effect that is obtained by optical element array sheet 101 of the present embodiment due to increasing the holding strength.

Figure 53:
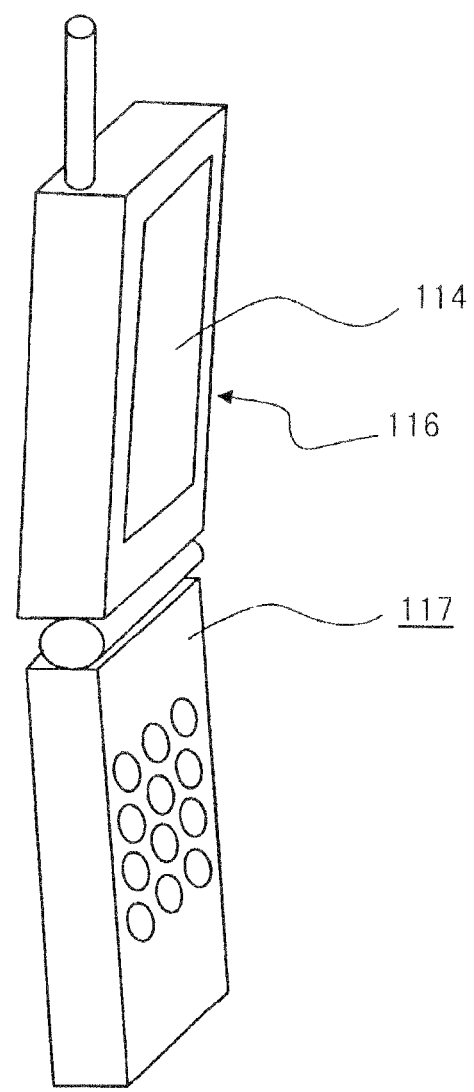
FIG. 53 is a perspective view showing the communication terminal in which the display device of the present embodiment is incorporated.

FIG. 53 is a perspective view showing a communication terminal as a portable terminal that incorporates a display device configured by bonding optical element array sheet 101 of the first to seventh embodiments to display panel 114.

As shown in FIG. 53, communication terminal 117 of the present embodiment is of a configuration provided with: a display device 116 that includes the above-described optical element array sheet 101, and a communication circuit unit (not shown). Display device 116 is provided with display panel 114 that includes a picture element unit composed of a plurality of electro-optical elements. In addition, marks (not shown) are provided on display panel 114 for positioning with respect to optical element array sheet 101, and optical element array sheet 101 is bonded using these marks as a positioning reference.

Optical element array sheet 101 of the present embodiment can be positioned and bonded with high accuracy to display panel 114. As a result, the present embodiment can be applied to a high-definition display device and can provide a portable terminal that is equipped with a high-definition display device.

The optical element array sheet according to the present invention may of course be formed in film form and is not subject to limitations regarding thickness. In addition, the optical element array sheet according to the present invention adopts a configuration having a rectangular outer shape, but the present invention is not limited to this shape and may be formed in, for example, a round shape. Still further, the portable terminal according to the present invention is ideally applicable to a communication terminal such as a portable telephone or to various types of portable personal computers such as portable information terminals.

While the invention has been shown and described with particular reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2008-066235, filed on Mar. 14, 2008, the disclosure of which is incorporated herein in its entirety by reference.

What is claimed is:

1. An optical element array sheet, comprising:
    a lower first side forming a flat horizontal bottom surface and an opposite upper second side, a vertical thickness therebetween;
    on the second side, a first area in which an optical element array is arranged that is formed from a plurality of optical elements having curved surfaces, said optical elements configured with a prescribed period;
    on the second side, a second area formed at an end of said first area and with a surface shape that differs from that of said first area; and
    on the second side, a trough formed at a border of said first area and said second area,
    wherein a side wall on said second-area side of said trough is formed inclined with respect to a reference line that extends in a thickness direction of said optical element array with a bottom of said trough as a point of origin,
    wherein said second area includes a flat horizontal portion in which said optical elements are not provided, and
    wherein a maximum vertical thickness of said optical elements with respect to the bottom surface is equal to a maximum thickness of said horizontal flat portion.

2. The optical element array sheet according to claim 1, wherein said trough is formed in a shape having line symmetry with respect to said reference line.

3. The optical element array sheet according to claim 1, wherein said second area is provided around the periphery of said optical element array sheet.

4. A display device, comprising:
    the optical element array sheet according to claim 1; and
    a display panel having a picture element unit composed of a plurality of electro-optical elements, provided with marks for positioning said optical element array sheet, and that is bonded together with said optical element array sheet.

5. A portable terminal provided with the display device according to claim 4.

6. The optical element array sheet according to claim 1,
    wherein the maximum vertical thickness of the optical elements is located at the apex of each of said curved surfaces of the optical elements, and
    the apices of the curved surfaces are in a same plane as the horizontal flat portion of the second area.

7. The optical element array sheet according to claim 1,
    wherein said curved surfaces of each of the optical elements are convex, and the maximum vertical thickness of the optical elements is located at the apex of each of the convex curved surfaces, and
    the apices of the convex curved surfaces are in a same plane as the horizontal flat portion of the second area.

8. An optical element array sheet comprising:
    a lower first side forming a flat horizontal bottom surface and an opposite upper second side, a vertical thickness therebetween;
    on the second side, a first area in which an optical element array is arranged that is formed from a plurality of optical elements having curved surfaces;
    on the second side, a second area formed at an end of said first area and with a surface shape that differs from that of said first area; and
    on the second side, a trough formed at a border of said first area and said second area,
    wherein a side wall on said second-area side of said trough is formed inclined with respect to a reference line that extends in a thickness direction of said optical element array with a bottom of said trough as a point of origin,
    wherein said optical element array is formed with a first period in said first area,
    wherein said second area includes a portion in which optical elements of said optical element array are formed with a second period that is shorter than the period of said first area, and
    wherein a maximum vertical thickness of the optical elements in the first area is equal to a maximum vertical thickness of optical elements of said optical element array in the second area.

9. The optical element array sheet according to claim 8, wherein said trough is formed in a shape having line symmetry with respect to said reference line.

10. The optical element array sheet according to claim 8, wherein said second area includes, in said optical element array formed at said second period, a portion in which optical elements are formed at a third period that differs from said first period and said second period.

11. The optical element array sheet according to claim 10, wherein, in the portion formed at said third period in said second area, a depression is provided that includes a bottom surface that forms a flat surface and side-walls that form inclined surfaces that are inclined with respect to a plane that is orthogonal to the bottom surface.

12. The optical element array sheet according to claim 8, wherein said second period is no greater than one-half of said first period.

13. The optical element array sheet according to claim 8, wherein said second period is no greater than one-fifth of said first period.

14. The optical element array sheet according to claim 8, wherein the arithmetic mean roughness Ra of the surface of said optical element array that is formed at said second period is no greater than 0.6 micrometer.

15. The optical element array sheet according to claim 8, wherein the arithmetic mean roughness Ra of the surface of said optical element array formed at said second period is no greater than 0.1 micrometer.

16. The optical element array sheet according to claim 8, wherein said optical element array formed at said second period in said second area is provided as far as the outer ends of said optical element array sheet.

17. The optical element array sheet according to claim 8, wherein said second area is provided around the periphery of said optical element array sheet.

18. A display device, comprising:
the optical element array sheet according to claim 8; and
a display panel having a picture element unit composed of a plurality of electro-optical elements, provided with marks for positioning said optical element array sheet, and that is bonded together with said optical element array sheet.

19. The optical element array sheet according to claim 8,
wherein the maximum vertical thickness of the optical elements in the first area is located at the apex of each of said curved surfaces,
wherein the maximum vertical thickness of the optical elements in the second area is located at the apex of curved surfaces of the optical elements of the second area, and
the apices of the curved surfaces of the first area are in a same plane as the apices of the curved surfaces of the second area.

20. The optical element array sheet according to claim 8, wherein the optical element array sheet consists of a single material.

* * * * *